(12) United States Patent
Nguyen Van et al.

(10) Patent No.: US 11,364,901 B2
(45) Date of Patent: *Jun. 21, 2022

(54) DRIVING SUPPORT APPARATUS

(71) Applicant: TOYOTA JIDOSHA KABUSHIKI KAISHA, Toyota (JP)

(72) Inventors: Quy Hung Nguyen Van, Susono (JP); Shoichi Hayasaka, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

This patent is subject to a terminal disclaimer.

(21) Appl. No.: 16/881,420

(22) Filed: May 22, 2020

(65) Prior Publication Data
US 2020/0282982 A1 Sep. 10, 2020

Related U.S. Application Data

(63) Continuation of application No. 16/124,412, filed on Sep. 7, 2018, now Pat. No. 10,696,297, which is a (Continued)

(30) Foreign Application Priority Data

May 29, 2014 (JP) .............................. JP2014-111774

(51) Int. Cl.
*G08G 1/16* (2006.01)
*B60W 30/09* (2012.01)
(Continued)

(52) U.S. Cl.
CPC ............ *B60W 30/09* (2013.01); *B60W 10/04* (2013.01); *B60W 10/184* (2013.01); (Continued)

(58) Field of Classification Search
CPC .... B60W 30/09; B60W 10/04; B60W 10/184; B60W 10/20; B60W 30/0956; (Continued)

(56) References Cited

U.S. PATENT DOCUMENTS

| 5,173,881 A | 12/1992 | Sindle |
| 5,734,336 A | 3/1998 | Smithline |

(Continued)

FOREIGN PATENT DOCUMENTS

| DE | 102014210256 A1 * | 11/2015 | ............ B60W 30/09 |
| EP | 2431225 A1 * | 3/2012 | ............ B60W 50/14 |

(Continued)

OTHER PUBLICATIONS

Data Logic Structure and Key Technologies on Intelligent High-precision Map;Liu, Jingnan; Jiao Zhan; Guo, Chi; Lei, Tingting; Li, Ying. Journal of Geodesy and Geoinformation Science; Beijing vol. 3, Iss. 3, (Sep. 2020): 1-17. DOI:10.11947/j.JGGS.2020.0301 (Year: 2020).*

(Continued)

*Primary Examiner* — Cuong H Nguyen
(74) *Attorney, Agent, or Firm* — Oblon, McClelland, Maier & Neustadt, L.L.P.

(57) ABSTRACT

A driving support apparatus according to the invention estimates the position of a moving body by controlling a position estimation unit when the tracking-target moving body leaves a first area or a second area to enter a blind spot area and detects the position of the moving body by controlling a position detection unit when the moving body leaves the blind spot area to enter the first area or the second area. In this manner, the trajectory of the tracking-target moving body is calculated so that the trajectory of the moving body detected in the first area or the second area and the trajectory of the moving body estimated in the blind spot (Continued)

area are continuous to each other and driving support is executed based on the calculated trajectory of the tracking-target moving body.

18 Claims, 14 Drawing Sheets

Related U.S. Application Data continuation of application No. 15/312,698, filed as application No. PCT/IB2015/000751 on May 27, 2015, now Pat. No. 10,106,154.

(51) Int. Cl.

| | | |
|---|---|---|
| B60W 30/08 | (2012.01) | |
| G01S 7/40 | (2006.01) | |
| G01S 13/72 | (2006.01) | |
| G01S 13/931 | (2020.01) | |
| B60W 30/095 | (2012.01) | |
| B60W 10/04 | (2006.01) | |
| B60W 10/184 | (2012.01) | |
| B60W 10/20 | (2006.01) | |
| B60W 30/16 | (2020.01) | |
| B60W 50/14 | (2020.01) | |
| G05D 1/02 | (2020.01) | |

(52) U.S. Cl.
CPC ............ *B60W 10/20* (2013.01); *B60W 30/08* (2013.01); *B60W 30/095* (2013.01); *B60W 30/0956* (2013.01); *B60W 30/162* (2013.01); *B60W 50/14* (2013.01); *G01S 7/40* (2013.01); *G01S 13/723* (2013.01); *G01S 13/931* (2013.01); *G05D 1/0219* (2013.01); *G05D 1/0238* (2013.01); *G08G 1/166* (2013.01); *G08G 1/167* (2013.01); *B60W 2050/143* (2013.01); *B60W 2050/146* (2013.01); *B60W 2520/105* (2013.01); *B60W 2520/14* (2013.01); *B60W 2554/00* (2020.02); *B60W 2554/80* (2020.02); *B60W 2720/24* (2013.01); *B60W 2754/10* (2020.02); *G01S 2013/9315* (2020.01); *G01S 2013/93274* (2020.01); *G05D 2201/0213* (2013.01)

(58) Field of Classification Search
CPC ....... B60W 30/08; G08G 1/166; G08G 1/167; G01S 13/723; G01S 2013/9315
USPC ............ 701/26; 340/435–436, 943, 937, 903
See application file for complete search history.

(56) References Cited

U.S. PATENT DOCUMENTS

| | | | | |
|---|---|---|---|---|
| 5,786,772 | A | 7/1998 | Schofield | |
| 8,493,195 | B2 | 7/2013 | Lee | |
| 8,744,742 | B2* | 6/2014 | Nishimaki | B60W 10/20 |
| | | | | 701/301 |
| 8,791,802 | B2* | 7/2014 | Schwindt | B60W 40/04 |
| | | | | 340/435 |
| 9,064,408 | B2* | 6/2015 | Komoguchi | B60Q 9/008 |
| 9,688,272 | B2* | 6/2017 | Shiraishi | B62D 15/0255 |
| 10,106,154 | B2* | 10/2018 | Nguyen Van et al. | |
| | | | | B60W 30/0956 |
| 10,696,297 | B2* | 6/2020 | Nguyen Van | B60W 10/184 |
| 10,876,855 | B2* | 12/2020 | Iwaasa | G01C 21/32 |
| 2005/0012604 | A1* | 1/2005 | Takahashi | G01S 13/931 |
| | | | | 340/435 |
| 2010/0117813 | A1* | 5/2010 | Lee | B60Q 9/008 |
| | | | | 340/435 |
| 2011/0137528 | A1* | 6/2011 | Le | G01S 13/931 |
| | | | | 701/45 |
| 2012/0194377 | A1 | 8/2012 | Yukumatsu et al. | |
| 2016/0196748 | A1 | 7/2016 | Yellambalase | |
| 2017/0101092 | A1* | 4/2017 | Nguyen Van | G01S 13/723 |
| 2017/0149820 | A1 | 5/2017 | Ruvio | |
| 2017/0291545 | A1 | 10/2017 | Lai | |
| 2017/0291547 | A1 | 10/2017 | Lai | |
| 2017/0341576 | A1 | 11/2017 | Lei | |
| 2018/0057003 | A1 | 3/2018 | Hyun | |
| 2019/0001971 | A1* | 1/2019 | Nguyen Van | B60W 10/20 |
| 2020/0282982 | A1* | 9/2020 | Nguyen Van | B60W 30/095 |

FOREIGN PATENT DOCUMENTS

| | | | | |
|---|---|---|---|---|
| JP | 2000-310538 | A | 11/2000 | |
| JP | 2004-279170 | A | 10/2004 | |
| JP | 2005-32063 | A | 2/2005 | |
| JP | 2005-132291 | A | 5/2005 | |
| JP | 2009-257763 | A | 11/2009 | |
| JP | 2010-211504 | A | 9/2010 | |
| JP | 2012-159348 | A | 8/2012 | |
| JP | WO 2013/046246 | | 4/2013 | |
| JP | 2013-186718 | A | 9/2013 | |
| JP | 2015-111926 | | 6/2015 | |
| JP | 2015123898 | A * | 7/2015 | ............ B60W 30/09 |
| JP | 2015225615 | A * | 12/2015 | ............ B60W 10/04 |
| JP | 6318864 | B2 * | 5/2018 | ............ B60W 10/04 |
| WO | WO 2008/043676 | | 4/2008 | |
| WO | WO-2015181611 | A2 * | 12/2015 | ............ B60W 10/04 |

OTHER PUBLICATIONS

ROS-based sensor fusion and motion planning for autonomous vehicles; Li, Yuanzhe. Wayne State University. ProQuest Dissertations Publishing, 2019. 13861122 (from https://www.proquest.com/openview/) (Year: 2019).*

Enhancements of V2X communication in support of cooperative autonomous driving, by Laurens Hobert et al., Dec. 2015 • IEEE Communications Magazine 53(12):64-70; DOI:10.1109/MCOM. 2015.7355568 (Year: 2015).*

Functional requirements of automotive Head Up Displays; by Juhee Park et al.; Applied Ergonomics, vol. 76, Apr. 2019, pp. 130-146 (from https://doi.org/10.1016/j.apergo.2018.12.017) (Year: 2019).*

V. K. Kukkala, J. Tunnell, S. Pasricha and T. Bradley, "Advanced Driver-Assistance Systems: A Path Toward Autonomous Vehicles ," in IEEE Consumer Electronics Magazine, vol. 7, No. 5, pp. 18-25, Sep. 2018, doi: 10.1109/MCE.2018.2828440. (Year: 2018).*

X. Ji, G. Zhang, X. Chen and Q. Guo, "Multi-Perspective Tracking for Intelligent Vehicle," in IEEE Transactions on Intelligent Transportation Systems, vol. 19, No. 2, pp. 518-529, Feb. 2018, doi: 10.1109/TITS.2017.2784486. (Year: 2018).*

H. Chae and K. Yi, "Virtual Target-Based Overtaking Decision, Motion Planning, and Control of Autonomous Vehicles," in IEEE Access, vol. 8, pp. 51363-51376, 2020, doi: 10.1109/ACCESS.2020. 2980391. (Year: 2020).*

Y.-Y. Tseng, P.-M. Hsu, J.-J. Chen and Y.-C. Tseng, "Computer Vision-Assisted Instant Alerts in 5G," 2020 29th International Conference on Computer Communications and Networks (ICCCN), 2020, pp. 1-9, doi: 10.1109/ICCCN49398.2020.9209751. (Year: 2020).*

International Search Report dated Dec. 1, 2015 in PCT/IB2015/000751 filed May 27, 2015.

Haptic Feedback to Assist Bus Drivers for Pedestrian Safety at Low Speed Vicent Girbés; Leopoldo Armesto; Juan Dols; Josep Tornero; IEEE Transactions on Haptics; Year: 2016, vol. 9, Issue: 3; pp. 345-357.

PathProx—a runway incursion alerting system; R. Cassell; C. Evers; Y. E. Yang; 19th DASC. 19th Digital Avionics Systems Conference. Proceedings (Cat. No. 00CH37126); Year: 2000, vol. 2; pp. 7D3/1-7D3/6 vol. 2.

Integrating Off-Board Cameras and Vehicle On-Board Localization for Pedestrian Safety; Paulo Vinicius Koerich Borges; Robert Zlot;

(56) References Cited

OTHER PUBLICATIONS

Ashley Tews; IEEE Transactions on Intelligent Transportation Systems; Year: 2013, vol. 14, Issue: 2; pp. 720-730.

Pedestrian detection in industrial environments: Seeing around corners; Paulo V. K. Borges; Ash Tews; Dave Haddon 2012 IEEE/RSJ International Conference on Intelligent Robots and Systems; Year: 2012; pp. 4231-4232.

Car trajectory prediction in image processing and control manners; Ping-Min Hsu; Zhen-Wei Zhu; 2016 IEEE International Conference on Intelligent Transportation Engineering (ICITE); Year: 2016: pp. 45-49.

Analysis of Positioning Uncertainty in Vehicular Environment; Abdul Bais; Yasser Morgan; 2016 International Conference on Frontiers of Information Technology (FIT); Year: 2016; pp. 309-314.

Development of sensor based front end collision avoidance system for highways; Tanuja Sheorey; Nikhil Vivek Shrivas; 2015 IEEE International Conference on Information and Automation; Year: 2015; pp. 594-598.

Notice of Allowance dated Jun. 11, 2018 in parent U.S. Appl. No. 15/312,698.

\* cited by examiner

F I G . 12
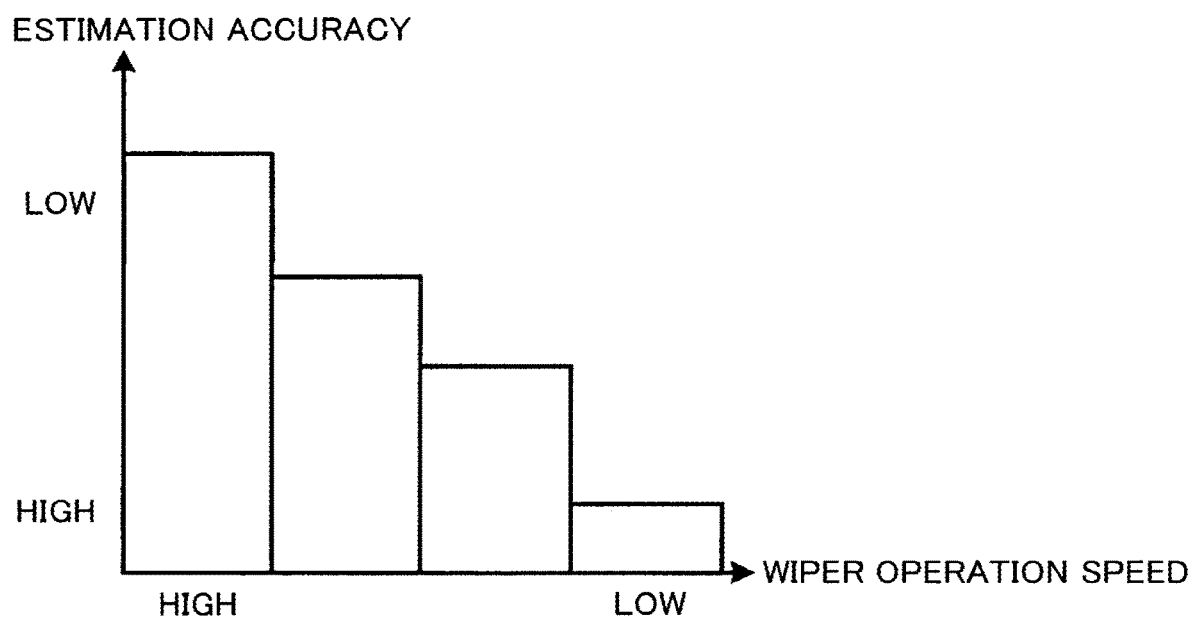

DRIVING SUPPORT APPARATUS

CROSS-REFERENCE TO RELATED APPLICATIONS

This application is a continuation of U.S. application Ser. No. 16/124,412, filed Sep. 7, 2018, which is a continuation of U.S. application Ser. No. 15/312,698, filed Nov. 21, 2016, which is now U.S. Pat. No. 10,106,154, issued Oct. 23, 2018, which is a National Stage of International Application No. PCT/IB2015/000751, filed May 27, 2015, which is based upon and claims the benefit of priority from Japanese Patent Application No. 2014-111774, filed May 29, 2014. The benefit of priority is claimed to each of the foregoing, and the entire contents of each of the foregoing are incorporated herein by reference.

BACKGROUND OF THE INVENTION

1. Field of the Invention

The invention relates to a driving support apparatus.

2. Description of Related Art

Techniques have been reported for detecting information on the position of another moving body that is present on a lateral side of a subject vehicle by using a plurality of sensors. For example, Japanese Patent Application Publication No. 2010-211504 (JP 2010-211504 A), discloses an object detection apparatus that is capable of detecting the position of a vehicle traveling in the vicinity of a roadside object. In addition, Japanese Patent Application Publication No. 2012-159348 (JP 2012-159348 A) discloses a technique in which a side detection target is registered as a tracking target that needs to be tracked in a side detection area when a moving target is detected in an overlapping area based on the result of measurement in a rear search mode and information on the overlapping-area moving target is handed over to the registered tracking target.

In a case where driving support for another moving body traveling in parallel to the vehicle by the vehicle is executed, the trajectory of the moving body has to be checked with accuracy from the position of the tracking-target moving body detected between the plurality of sensors mounted on the subject vehicle.

According to the related art, however, the trajectory of the moving body may not be checked in a case where the other moving body traveling in parallel to the vehicle by the vehicle moves into a blind spot area between the plurality of sensors. In this case, the trajectory of the moving body cannot be checked once the moving body enters the blind spot area, although the driving support can continue, in a state where the trajectory of the tracking-target moving body can be checked in the areas detected by the sensors, and thus an event occurs in which the driving support that should be continuously executed is halted. In addition, the halted driving support may be abruptly resumed once the moving body in the blind spot area moves back into the detected area. In this case, a driver may feel uncomfortable.

According to the related art as described above, the trajectory of the tracking-target moving body cannot be calculated when the moving body moves into the blind spot area from within the area detected by the sensor during the execution of the driving support for the tracking-target moving body. Accordingly, driving support for avoiding, for example, a collision with the moving body may not be performed with continuity.

SUMMARY OF THE INVENTION

The invention provides a driving support apparatus that can continuously execute the driving support based on the trajectory of the moving body tracked by checking the position of the moving body moving in the blind spot area even in a case where another moving body traveling in parallel to a vehicle by the vehicle moves into a blind spot area between a plurality of sensors during the execution of the driving support for the tracking-target moving body.

The driving support apparatus according to the invention includes a first sensor provided at a front lateral side mounting position of a subject vehicle and detecting a situation of a first area on a front lateral side of the subject vehicle, a second sensor provided at a rear lateral side mounting position of the subject vehicle and detecting a situation of a second area on a rear lateral side of the subject vehicle, the second area being an area different from the first area, a position detection unit configured to detect the position of a tracking-target moving body moving in the first area and the second area, a position estimation unit configured to estimate the position of the tracking-target moving body moving in a blind spot area based on the position of the tracking-target moving body detected in any one of the first area and the second area by the position detection unit, the blind spot area being a surrounding area on a lateral side of the subject vehicle and being an area other than the first area and the second area, a trajectory calculation unit configured to calculate the trajectory of the tracking-target moving body, so that the trajectory of the moving body detected in the first area and the second area and the trajectory of the moving body estimated in the blind spot area are continuous to each other, by estimating the position of the moving body by controlling the position estimation unit when the tracking-target moving body leaves one of the first area and the second area and enters the blind spot area and by detecting the position of the moving body by controlling the position detection unit when the moving body leaves the blind spot area and enters the other one of the first area and the second area, and a support execution unit configured to execute driving support based on the trajectory of the tracking-target moving body calculated by the trajectory calculation unit.

In the driving support apparatus, the support execution unit may be configured to change a content of the support for the driving support in accordance with estimation accuracy of the position of the tracking-target moving body estimated by the position estimation unit.

In the driving support apparatus, the support execution unit may be configured to execute the driving support by executing vehicle control in a case where the estimation accuracy is high and may be configured to execute the driving support by providing notification in a case where the estimation accuracy is low.

In the driving support apparatus, the estimation accuracy may be set to decrease as a relative speed between the subject vehicle and the tracking-target moving body decreases and to increase as the relative speed increases.

In the driving support apparatus, the estimation accuracy may be set in accordance with an attribute of the tracking-target moving body.

In the driving support apparatus, the estimation accuracy may be set to increase as an acceleration and deceleration of the moving body other than the tracking-target moving body present around the subject vehicle at which the moving body approaches the tracking-target moving body decreases and to decrease as the acceleration and deceleration increases.

In the driving support apparatus, the estimation accuracy may be set to increase as a distance from the subject vehicle to an intersection increases and to decrease as the distance decreases.

In the driving support apparatus, the estimation accuracy may be set to increase as a humidity around the subject vehicle decreases and to decrease as the humidity increases.

In the driving support apparatus, the estimation accuracy may be set to increase as a rainfall around the subject vehicle decreases and to decrease as the rainfall increases.

According to the driving support apparatus of the invention, the driving support can be continuously executed based on the trajectory of the moving body tracked by checking the position of the moving body moving in the blind spot area even in a case where the other moving body traveling in parallel to the vehicle by the vehicle moves into the blind spot area between the plurality of sensors during the execution of the driving support for the tracking-target moving body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 12 is a diagram illustrating an example of a relationship between the estimation accuracy and a wiper operation speed;

DETAILED DESCRIPTION OF EMBODIMENTS

Hereinafter, an embodiment of a driving support apparatus according to the invention will be described in detail with reference to the accompanying drawings. The invention is not limited to the embodiment. The components of the embodiment described below include those that can be readily assumed by those skilled in the art or those substantially identical thereto.

Embodiment

Figure 1:
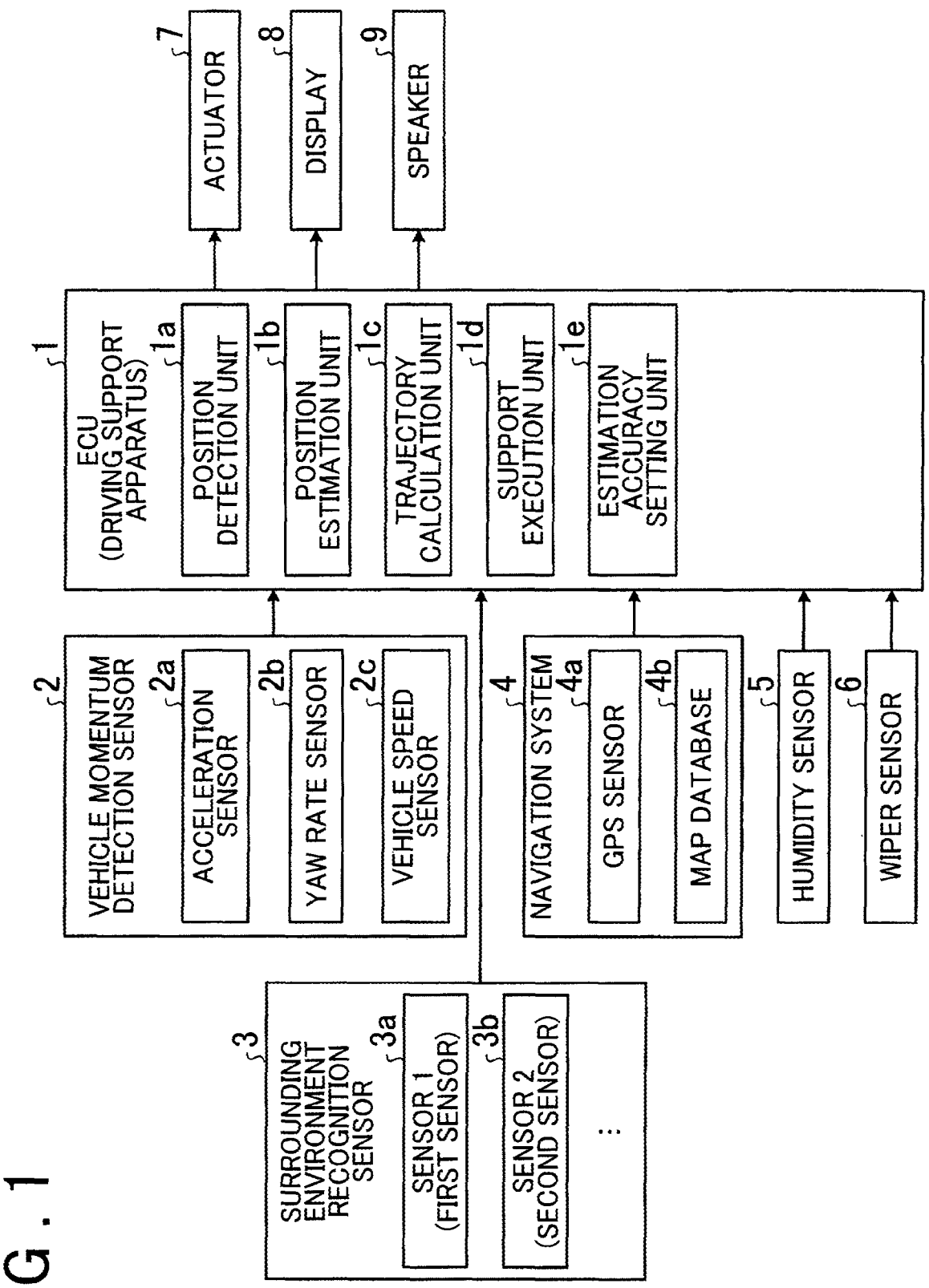
FIG. 1 is a diagram illustrating the configuration of a driving support apparatus according to the invention.
Figure 2:
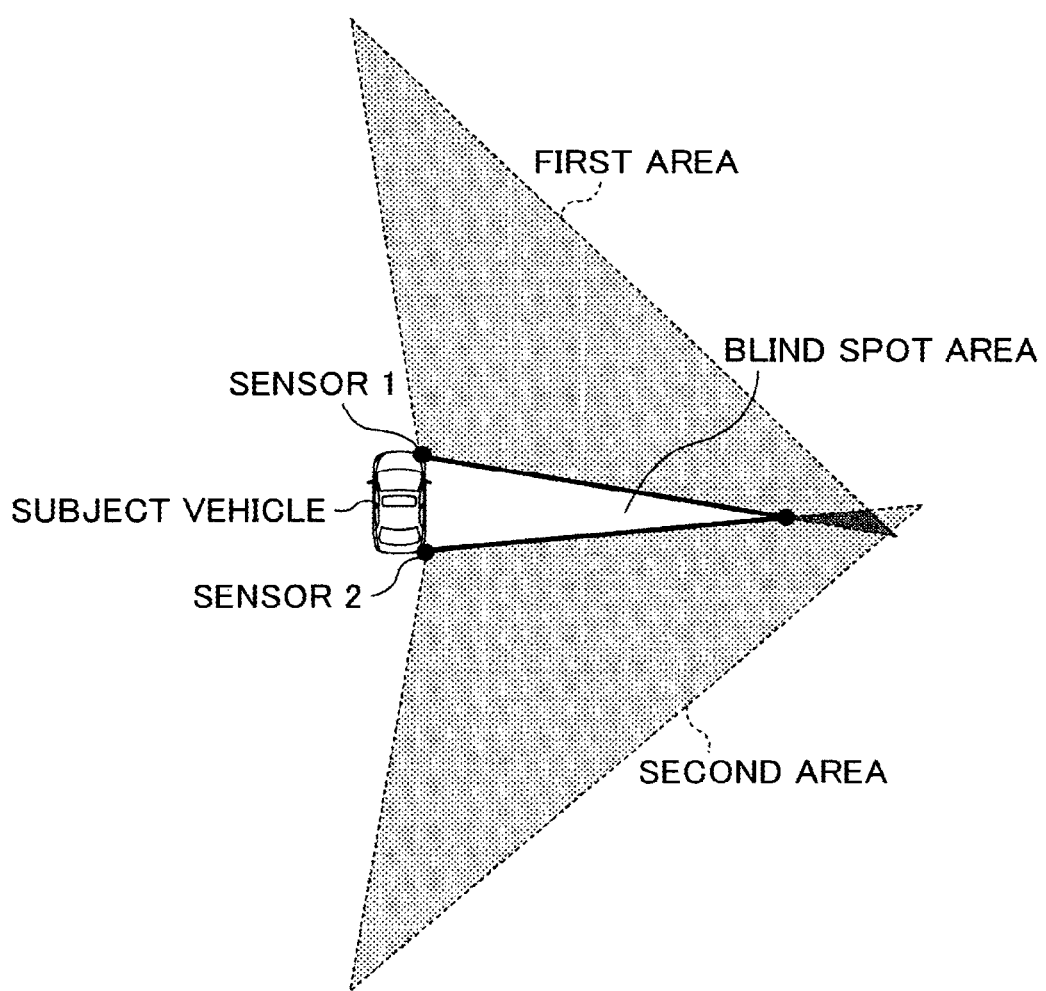
FIG. 2 is a diagram illustrating examples of areas detected by a plurality of surrounding environment recognition sensors mounted on a vehicle and a blind spot area.
Figure 3:
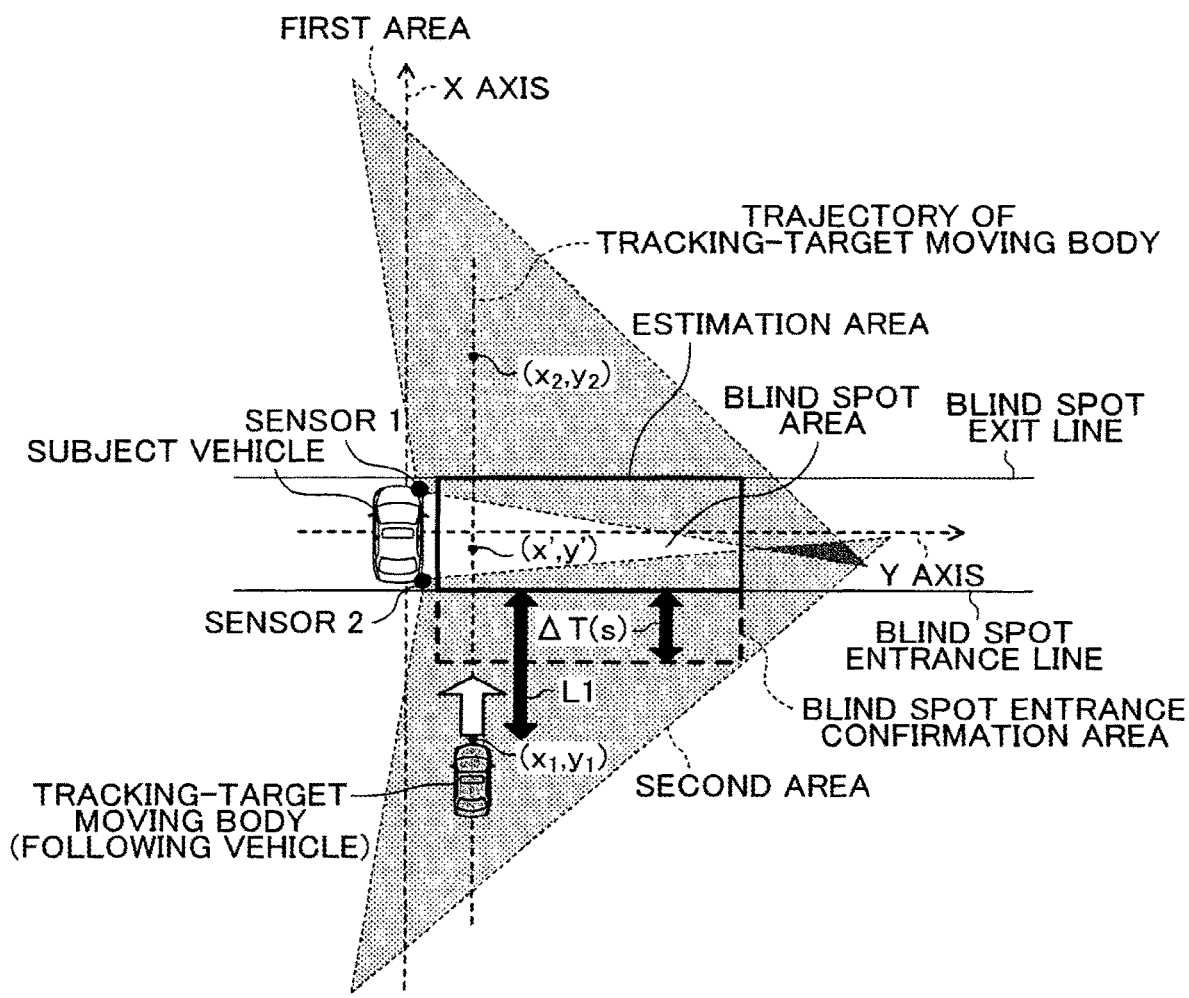
FIG. 3 is a diagram illustrating an example of a situation in which a trajectory of a tracking-target moving body passing through the blind spot area is calculated.
Figure 4:
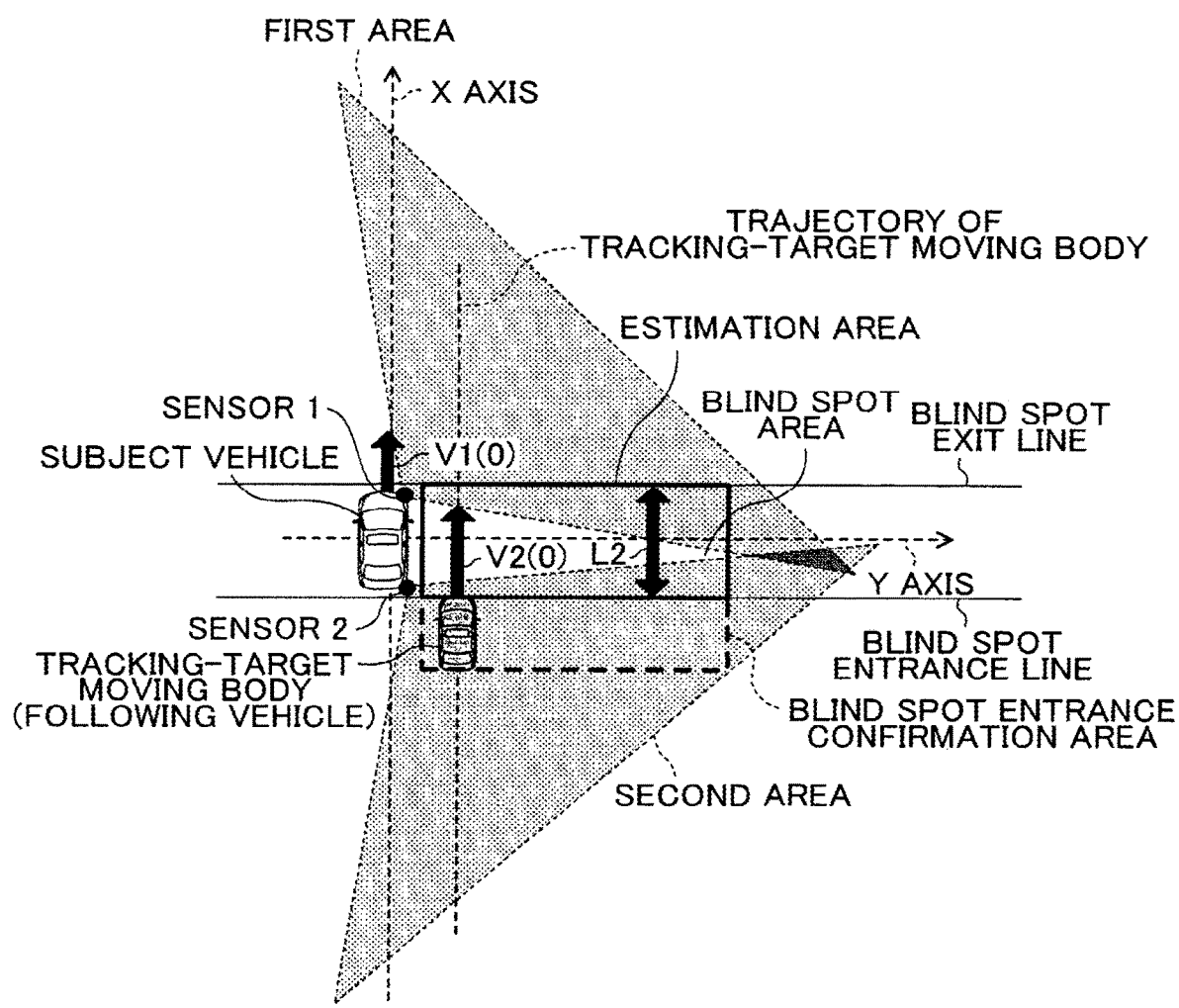
FIG. 4 is a diagram illustrating an example of a situation in which estimation accuracy is set in accordance with a relative speed.
Figure 5:
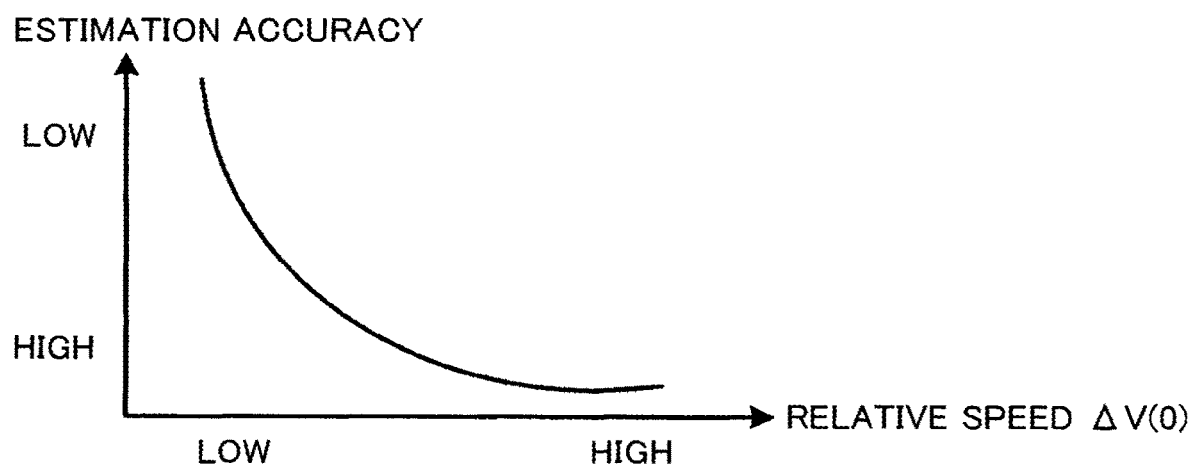
FIG. 5 is a diagram illustrating an example of a relationship between the estimation accuracy and the relative speed.
Figure 6:
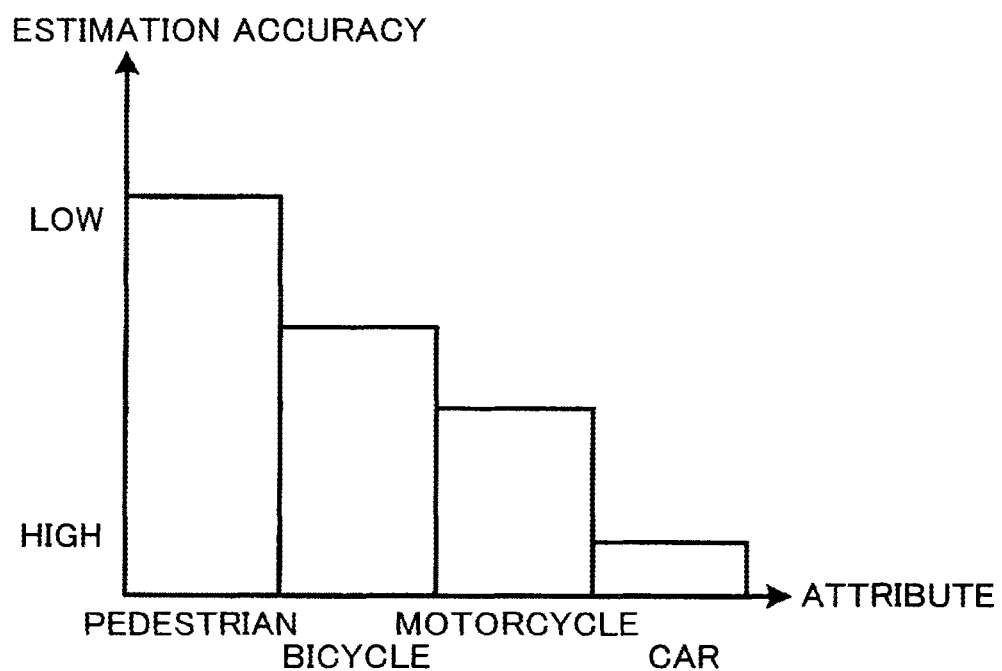
FIG. 6 is a diagram illustrating an example of a relationship between the estimation accuracy and an attribute.
Figure 7:
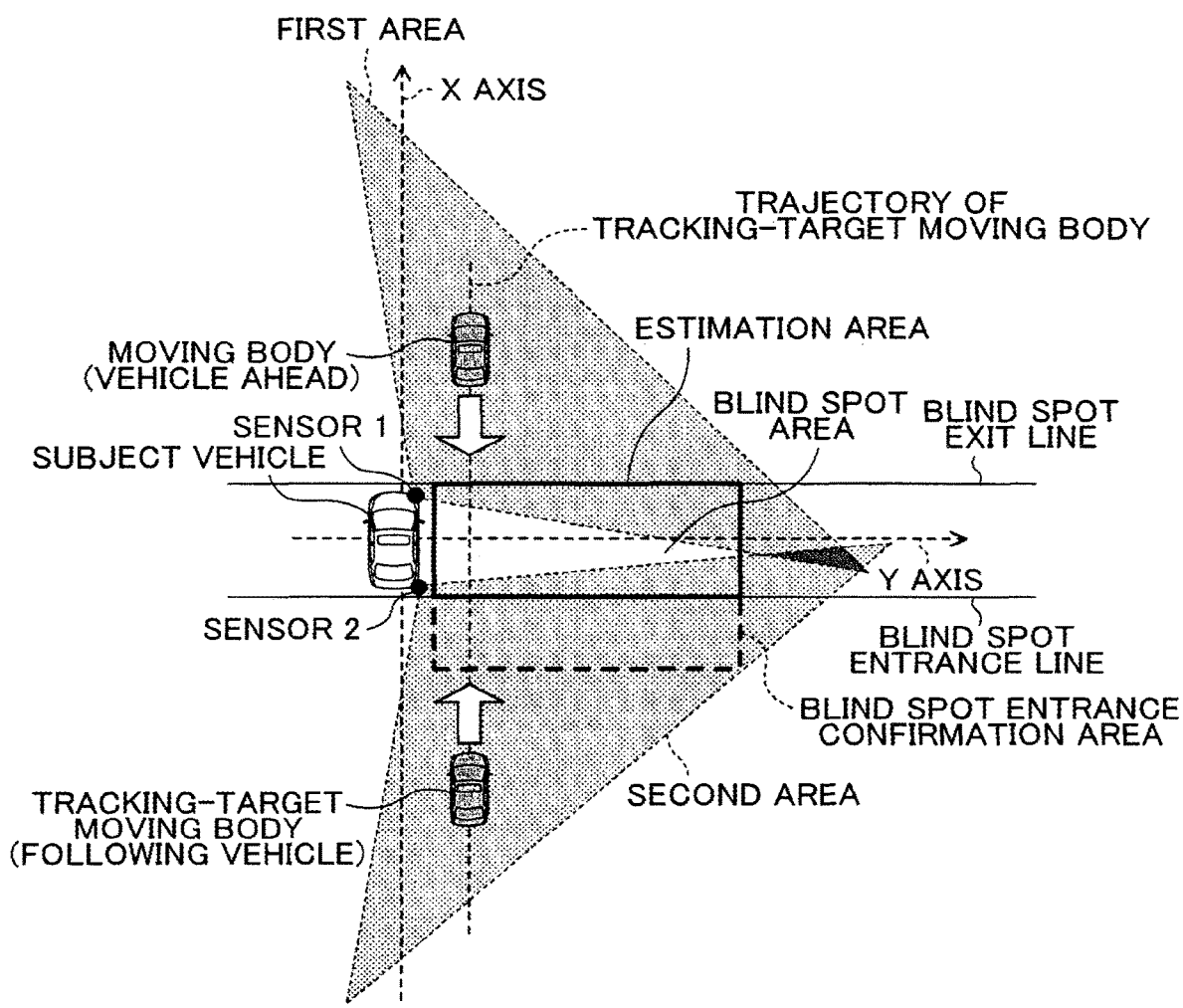
FIG. 7 is a diagram illustrating an example of a situation in which the estimation accuracy is set in accordance with the acceleration and deceleration of moving body.
Figure 8:
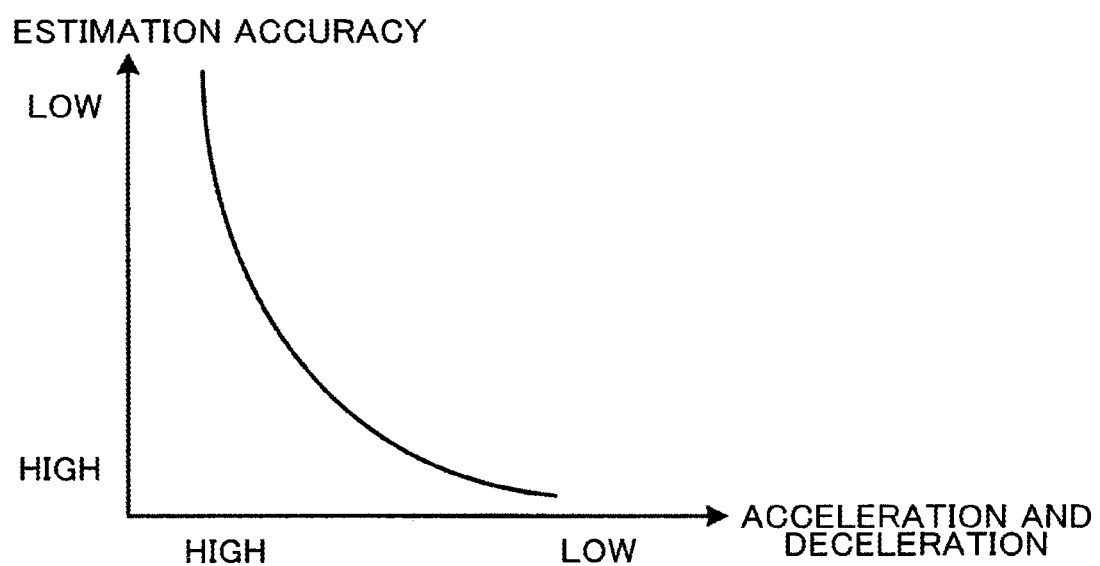
FIG. 8 is a diagram illustrating an example of a relationship between the estimation accuracy and the acceleration and deceleration.
Figure 9:
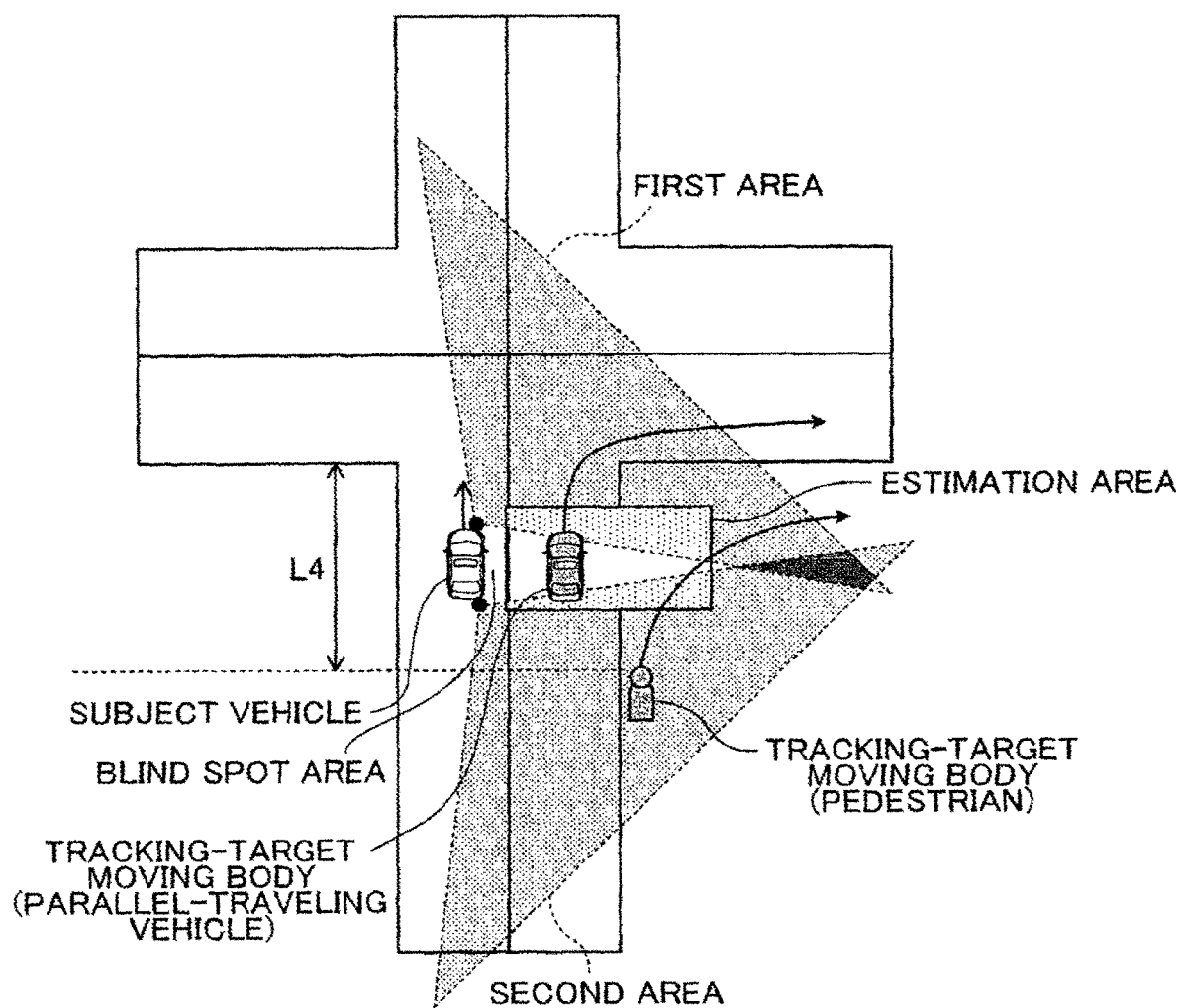
FIG. 9 is a diagram illustrating an example of a situation in which the estimation accuracy is set in accordance with the distance to an intersection.
Figure 10:
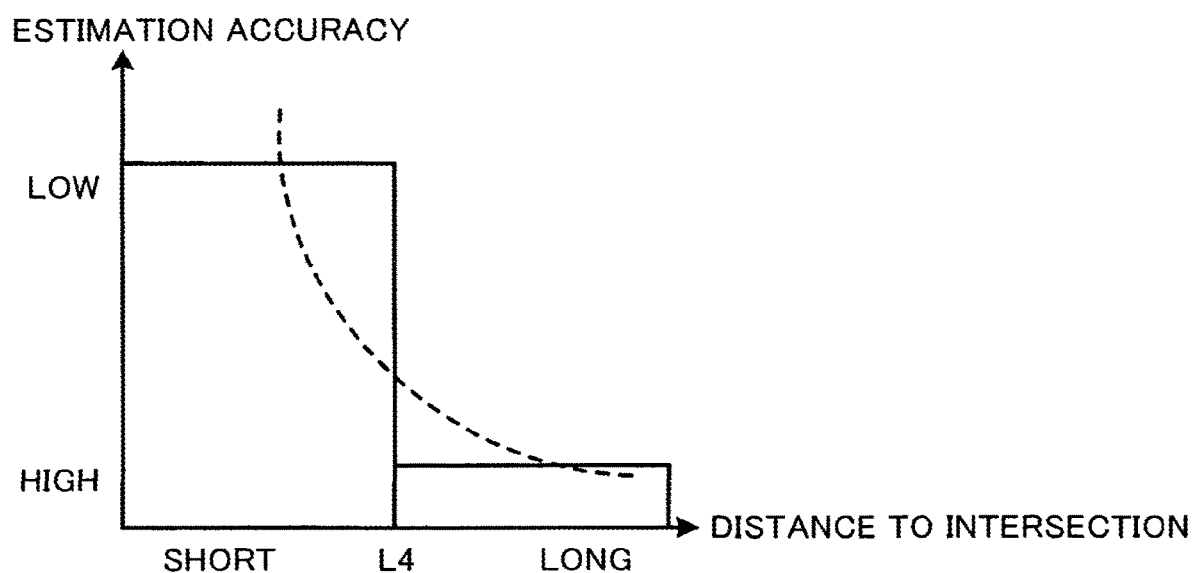
FIG. 10 is a diagram illustrating an example of a relationship between the estimation accuracy and the intersection.
Figure 11:
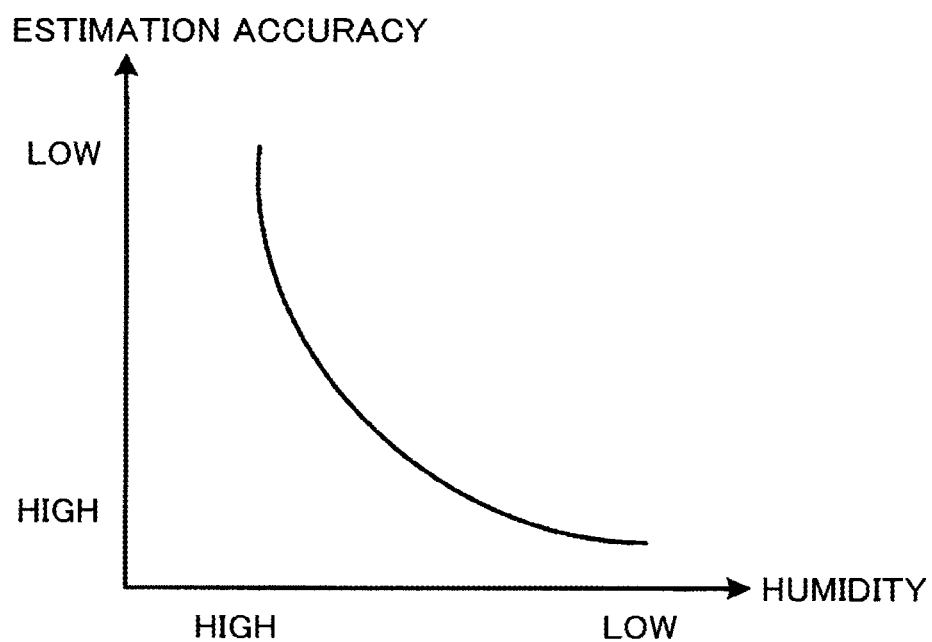
FIG. 11 is a diagram illustrating an example of a relationship between the estimation accuracy and humidity.

The configuration of the driving support apparatus according to the invention will be described with reference to FIGS. 1 to 12. FIG. 1 is a diagram illustrating the configuration of the driving support apparatus according to the invention. FIG. 2 is a diagram illustrating examples of areas detected by a plurality of surrounding environment recognition sensors mounted on a vehicle and a blind spot area. FIG. 3 is a diagram illustrating an example of a situation in which a trajectory of a tracking-target moving body passing through the blind spot area is calculated. FIG. 4 is a diagram illustrating an example of a situation in which estimation accuracy is set in accordance with a relative speed. FIG. 5 is a diagram illustrating an example of a relationship between the estimation accuracy and the relative speed. FIG. 6 is a diagram illustrating an example of a relationship between the estimation accuracy and an attribute. FIG. 7 is a diagram illustrating an example of a situation in which the estimation accuracy is set in accordance with the acceleration and deceleration of moving body other than the following vehicle. FIG. 8 is a diagram illustrating an example of a relationship between the estimation accuracy and the acceleration and deceleration. FIG. 9 is a diagram illustrating an example of a situation in which the estimation accuracy is set in accordance with the distance to an intersection. FIG. 10 is a diagram illustrating an example of a relationship between the estimation accuracy and the intersection. FIG. 11 is a diagram illustrating an example of a relationship between the estimation accuracy and humidity. FIG. 12 is a diagram illustrating an example of a relationship between the estimation accuracy and a wiper operation speed.

In this embodiment, an ECU 1 functions as the driving support apparatus for executing driving support based on the trajectory of the moving body that is tracked by detecting or estimating the position of the moving body traveling in parallel to a subject vehicle by the subject vehicle from information which is input from surrounding environment recognition sensors 3. The ECU 1 is electrically connected to vehicle momentum detection sensors 2, the surrounding environment recognition sensors 3, a navigation system 4, a humidity sensor 5, a wiper sensor 6, an actuator 7, a display 8, and a speaker 9. The ECU 1 performs computation processing based on various signals that are input from the vehicle momentum detection sensors 2, the surrounding environment recognition sensors 3, the navigation system 4, the humidity sensor 5, and the wiper sensor 6. The ECU 1 executes the driving support via at least one of the actuator 7, the display 8, and the speaker 9 in accordance with the result of the computation processing based on the various signals.

The vehicle momentum detection sensors 2 are vehicle momentum detection devices that detect various types of information showing a vehicle momentum. In this embodiment, the vehicle momentum detection sensors 2 include an acceleration sensor 2a, a yaw rate sensor 2b, and a vehicle speed sensor 2c. The acceleration sensor 2a is an acceleration detection device that detects an acceleration which is applied to a vehicle body. The acceleration sensor 2a outputs, to the ECU 1, a signal that shows the magnitude of the detected acceleration. The yaw rate sensor 2b is a yaw rate detection device that detects the yaw rate of the vehicle. The yaw rate sensor 2b outputs, to the ECU 1, a signal that shows the magnitude of the detected yaw rate. The vehicle speed sensor 2c is a vehicle wheel speed detection device that is disposed in each vehicle wheel and detects each vehicle wheel speed. The vehicle speed sensor 2c detects the vehicle wheel speed that is the rotation speed of each vehicle wheel. The vehicle speed sensors 2c output, to the ECU 1, signals that show the detected vehicle wheel speeds of the respective vehicle wheels. The ECU 1 calculates the vehicle speed that is the traveling speed of the vehicle based on the vehicle wheel speeds of the respective vehicle wheels input from the respective vehicle speed sensors 2c. The ECU 1 may calculate the vehicle speed based on the vehicle wheel speed that is input from at least one of the vehicle speed sensors 2c. As described above, the vehicle momentum detection sensors 2 detect the acceleration that is detected by the acceleration sensor 2a, the yaw rate that is detected by the yaw rate sensor 2b, and the vehicle wheel speed that is detected by the vehicle speed sensor 2c as the information showing the vehicle momentum, and output the information to the ECU 1.

The surrounding environment recognition sensors 3 are surrounding environment recognition devices that recognize a situation surrounding the vehicle such as a moving object and a stationary obstacle around the vehicle. Radar, a camera, and the like constitute the surrounding environment recognition sensors 3. The surrounding environment recognition sensors 3 acquire, as surrounding environment information, information such as a relative position of a white line on a road, a relative position of a surrounding obstacle, and a relative position, a relative speed, and a relative acceleration with respect to a surrounding moving target, and output the surrounding environment information to the ECU 1. In addition, the surrounding environment recognition sensors 3 may acquire, as the surrounding environment information, information relating to the attribute of the surrounding obstacle such as the strength, brightness, and color of the recognition target as well as the information such as the relative position and the relative speed of the recognition target around the vehicle and may output the surrounding environment information to the ECU 1. For example, in a case where the radar constitutes the surrounding environment recognition sensors 3, the wavelength patterns of the reflected waves of the radar differ between a case where the object that is the recognition target of the surrounding environment recognition sensors 3 has a high strength and a case where the object has a low strength. The surrounding environment recognition sensors 3 detect the strength of the recognition target by using the wavelength pattern difference. In a case where the radar constitutes the surrounding environment recognition sensors 3, the brightness and the color of the recognition target are detected by the difference between the wavelength patterns of the reflected waves of the radar. In a case where the camera constitutes the surrounding environment recognition sensors 3, the brightness and the color of the recognition target are detected by an image contrast difference.

In this embodiment, the plurality of surrounding environment recognition sensors 3 are mounted on the vehicle. For example, as illustrated in FIG. 2, a sensor 1 (3a) as a first sensor and a sensor 2 (3b) as a second sensor constitute the surrounding environment recognition sensors 3. According to FIG. 2, the subject vehicle has the sensor 1 on a right front lateral side mounting position of the subject vehicle and has the sensor 2 on a right rear lateral side mounting position of the subject vehicle. Herein, the sensor 1 and the sensor 2 detect the situations of different detection areas. For example, as illustrated in FIG. 2, the sensor 1 detects the situation of a first area on a right front side of the subject vehicle and the sensor 2 detects the situation of a second area on a right rear side of the subject vehicle, which is an area different from the first area. As illustrated in FIG. 2, the first area and the second area do not constitute a detection area that fully covers the right side of the subject vehicle, and thus the blind spot area is present between the first area and the second area. In this embodiment, the blind spot area is an area surrounding a lateral side of the subject vehicle and is an area other than the first area and the second area. In other words, the blind spot area means an area where the sensor 1 cannot detect, in the first area, the position information of the tracking-target moving body that is present around the subject vehicle and the sensor 2 cannot detect, in the second area, the position information of the tracking-target moving body that is present around the subject vehicle, and a surrounding area within a predetermined range from the vehicle. In the example of FIG. 2, the blind spot area is illustrated as an area that connects the mounting position of the sensor 1, the mounting position of the sensor 2, and the intersection where the boundary line of the first area and the boundary line of the second area intersect with each other. More specifically, in the example of FIG. 2, the second area is set to overlap part of the first area, and thus the blind spot area is an area that connects the mounting position of the sensor 1, the mounting position of the sensor 2, and the intersection where the boundary line of the first area and the boundary line of the second area intersect with each other and an area where the first area and the second area do not overlap each other.

The number of the surrounding environment recognition sensors 3 that are mounted on the vehicle is not limited to two as in the example of FIG. 2. Two or more sensors may be mounted on the vehicle. For example, although only two sensors, one being the sensor 1 and the other being the sensor 2, are provided on the right side of the subject vehicle in the example of FIG. 2, sensors may be provided on the left side of the subject vehicle as well. For example, although not illustrated herein, a sensor 3 may be provided on a left front lateral side mounting position of the subject vehicle and a sensor 4 may be provided on a left rear lateral side mounting position of the subject vehicle. In a case where the sensor 3 and the sensor 4 are provided on the left side of the subject vehicle, the sensor 3 detects the situation of a third area on a left front side of the subject vehicle and the sensor 4 detects the situation of a fourth area on a left rear side of the subject vehicle, which is an area different from the third area. In this case, the first sensor may be the sensor 3 and the second sensor may be the sensor 4. However, in the description of the following example, the first sensor will be described as the sensor 1 and the second sensor will be described as the sensor 2 for convenience of description.

Referring back to FIG. 1, the basic function of the navigation system 4 is to guide the subject vehicle to a predetermined destination. The navigation system 4 is provided at least with a GPS sensor 4a that is used to detect the current position of the subject vehicle by electric navigation, a map database 4b that stores map information required for the traveling of the vehicle, and a computation processing device that computes information on a path from the subject vehicle to a predetermined destination. In this embodiment, the navigation system 4 outputs, to the ECU 1, various types of information obtained by the GPS sensor 4a, the map database 4b, the computation processing device, and the like. In this embodiment, examples of the various types of information transmitted from the navigation system 4 to the ECU 1 include information on the position of the subject vehicle, information on the position of the intersection, and information on the path from the subject vehicle to the predetermined destination. However, the various types of information transmitted from the navigation system 4 to the ECU 1 are not limited thereto.

The humidity sensor 5 is a humidity detection device that detects humidity around the subject vehicle. The humidity sensor 5 outputs, to the ECU 1, a signal that shows the level of the detected humidity. The wiper sensor 6 is a wiper operation speed detection device that detects the operation speed of a wiper which is mounted on the front window of the subject vehicle or the like. The wiper sensor 6 outputs, to the ECU 1, a signal that shows the detected wiper operation speed. The ECU 1 estimates the rainfall around the subject vehicle based on the signal that is input from the wiper sensor 6. The ECU 1 estimates that the rainfall around the subject vehicle is large when the wiper operation speed is high and estimates that the rainfall around the subject vehicle is small when the wiper operation speed is low.

The actuator 7 is a brake actuator, accelerator actuator, and steering actuator that intervenes in a driver's driving operation and drives the brake, accelerator, and steering of the subject vehicle based on a driving support signal from the ECU 1. The display 8, which is a display device that is disposed in the vehicle, displays various types of information and provides a warning or notification for the driver in accordance with the driving support signal output from the ECU 1. The speaker 9 provides a warning or notification for the driver by outputting a predetermined sound in accordance with the driving support signal from the ECU 1. In this manner, the display 8 and the speaker 9 perform screen display and sound output as a human-machine interface (HMI) such as a head-up display (HUD).

According to FIG. 1, the ECU 1 is provided at least with a position detection unit 1a, a position estimation unit 1b, a trajectory calculation unit 1c, a support execution unit 1d, and an estimation accuracy setting unit 1e.

The position detection unit 1a of the ECU 1 is a position detection unit that detects the position of the tracking-target moving body which moves in the first area covered by the first sensor and the second area covered by the second sensor. Specifically, the position detection unit 1a detects the position of the tracking-target moving body that moves in the first area and the second area based on the surrounding environment information input from the surrounding environment recognition sensors 3. In addition, the position detection unit 1a functions to detect the speed and the acceleration and deceleration of the tracking-target moving body that moves in the first area and the second area based on the surrounding environment information input from the surrounding environment recognition sensors 3.

The position estimation unit 1b of the ECU 1 is a position estimation unit that estimates the position of the tracking-target moving body which moves in the blind spot area, which is a surrounding area on a lateral side of the subject vehicle and is an area other than the first area and the second area, based on the position of the tracking-target moving body detected in at least one of the first area and the second area by the position detection unit 1a. Specifically, the position estimation unit 1b estimates the position of the tracking-target moving body that moves into the blind spot area from within the first area based on the surrounding environment information detected in the first area and input by the surrounding environment recognition sensors 3 immediately before the tracking-target moving body enters the blind spot area. Alternatively, the position estimation unit 1b estimates the speed and the acceleration of the tracking-target moving body that moves into the blind spot area from within the second area based on the surrounding environment information detected in the second area and input by the surrounding environment recognition sensors 3 immediately before the tracking-target moving body enters the blind spot area.

The trajectory calculation unit 1c of the ECU 1 is a trajectory calculation unit that calculates the trajectory of the tracking-target moving body, so that the trajectory of the moving body detected in the first area and the second area and the trajectory of the moving body estimated in the blind spot area are continuous to each other, by estimating the position of the moving body by controlling the position estimation unit 1b when the tracking-target moving body leaves one of the first area and the second area and enters the blind spot area and by detecting the position of the moving body by controlling the position detection unit 1a when the moving body leaves the blind spot area and enters the other one of the first area and the second area. In other words, the trajectory calculation unit 1c calculates the trajectory of the tracking-target moving body, so that the trajectory of the moving body detected in the first area and the second area and the trajectory of the moving body estimated in the blind spot area are continuous to each other, by estimating the position of the moving body by controlling the position estimation unit 1b when the tracking-target moving body leaves the first area to enter the blind spot area or the tracking-target moving body leaves the second area to enter the blind spot area and by detecting the position of the moving body by controlling the position detection unit 1a when the moving body leaves the blind spot area to enter the second area after leaving the first area and entering the blind spot area or the moving body leaves the blind spot area to enter the first area after leaving the second area and entering the blind spot area. In this embodiment, the tracking-target moving body that is tracked by the trajectory calculation unit 1c is a moving body which enters the first area through the blind spot area from the second area or a moving body which enters the second area through the blind spot area from the first area.

The processing for switching between the control by the position estimation unit 1b and the control by the position detection unit 1a that is executed by the trajectory calculation unit 1c will be described in detail with reference to FIG. 3. In FIG. 3, a following vehicle is illustrated as an example of the tracking-target moving body, the following vehicle moving into the first area covered by the sensor 1 as the first sensor on the right front side of the subject vehicle from a position in the second area covered by the sensor 2 as the second sensor on the right rear side of the subject vehicle through the blind spot area on a right side of the subject vehicle. In FIG. 3, the center of the subject vehicle is a starting point, the traveling direction of the subject vehicle is the X axis, and the direction perpendicular to the traveling direction of the subject vehicle is the Y axis. In addition, in FIG. 3, an estimation area is set in advance to include the blind spot area on the right side of the subject vehicle. The estimation area is a rectangular area in which the line connecting the mounting position of the sensor 1 to the mounting position of the sensor 2 and parallel to the X axis is the short side and the respective lines parallel to the Y axis from the mounting position of the sensor 1 and the mounting position of the sensor 2 and extended for the blind spot area to be included are the long sides. In this embodiment, the upper long side of the estimation area corresponds to a blind spot exit line and the lower long side of the estimation area corresponds to a blind spot entrance line. In FIG. 3, a blind spot entrance confirmation area is set in advance within a predetermined range on a side nearer (that is, the rear side of the subject vehicle) than the blind spot entrance line on the lower side of the estimation area. The blind spot entrance confirmation area is an area that is used to confirm that the tracking-target moving body enters the blind spot area for the subject vehicle.

In the situation illustrated in FIG. 3, the trajectory calculation unit 1c detects the position $(x_1, y_1)$ of the following vehicle as the tracking-target moving body in the second area covered by the second sensor by controlling the position detection unit 1a and also detects the speed $(Vx_1, Vy_1)$ of the moving body. Then, the trajectory calculation unit 1c determines whether the tracking-target moving body enters the blind spot area based on the position $(x_1, y_1)$ of the moving body detected by the position detection unit 1a and the speed $(Vx_1, Vy_1)$ of the moving body. For example, in a case where a determination threshold $\Delta T(s)$ is set as the length of time required for the tracking-target moving body to move the distance corresponding to the height of the blind spot entrance confirmation area (that is, the short side of the rectangle) and the distance from the position $(x_1, y_1)$ of the moving body to the blind spot entrance line is a distance L1, the trajectory calculation unit 1c calculates the length of time $t(s)$ required for the moving body to move to the blind spot entrance line from the position $(x_1, y_1)$ of the moving body as "$t(s)=L1/(Vx_1, Vy_1)$". Then, the trajectory calculation unit 1c determines that the tracking-target moving body enters the blind spot area for the subject vehicle in a case where the time $t(s)$ required for the moving body to move to the blind spot entrance line satisfies the condition of "$t(s)<\Delta T(s)$".

The trajectory calculation unit 1c executes the following processing in a case where the following vehicle as the tracking-target moving body is determined to enter the blind spot area for the subject vehicle. When the position $(x_0, y_0)$ and the speed $(Vx_0, Vy_0)$ of the moving body are detected by the position detection unit 1a on the blind spot entrance line that corresponds to the lower side of the estimation area in the second area covered by the second sensor, the trajectory calculation unit 1c switches from the control by the position detection unit 1a to the control by the position estimation unit 1b and estimates the position $(x', y')$ and the speed $(V'x, V'y)$ of the moving body moving in the estimation area including the blind spot area. For example, the trajectory calculation unit 1c controls the position estimation unit 1b, and calculates the x coordinate showing the position of the moving body moving in the estimation area as "$x'=x_0+(Vx_0)\times$estimated elapsed time" and calculates the y coordinate showing the position of the moving body moving in the estimation area as "$y'=y_0+(Vy_0)\times$estimated elapsed time". Herein, the estimated elapsed time means the elapsed time that begins to be counted when the moving body passes through the blind spot entrance line. In addition, the trajectory calculation unit 1c controls the position estimation unit 1b, and calculates the speed of the moving body moving in the estimation area as "$(V'x, V'y)=(Vx_0, Vy_0)$" on the assumption that the moving body moves in the estimation area in a state where the speed $(Vx_0, Vy_0)$ detected on the blind spot entrance line by the position detection unit 1a is maintained. Then, the trajectory calculation unit 1c switches from the control by the position estimation unit 1b to the control by the position detection unit 1a when the position $(x_2, y_2)$ and the speed $(Vx_2, Vy_2)$ of the moving body are detected by the position detection unit 1a on the blind spot exit line corresponding to the upper side of the estimation area in the first area covered by the first sensor.

The trajectory calculation unit 1c calculates the trajectory of the tracking-target moving body based on the position of the following vehicle as the tracking-target moving body that is obtained in this manner. Specifically, as illustrated in FIG. 3, the trajectory calculation unit 1c calculates the trajectory of the following vehicle as the tracking-target moving body based on the position of the moving body detected to the blind spot entrance line in the second area covered by the second sensor by the position detection unit 1a, the position of the moving body estimated in the estimation area by the position estimation unit 1b, and the position of the moving body detected from the blind spot exit line in the first area covered by the first sensor by the position detection unit 1a.

In the example described with reference to FIG. 3, the estimation area is set in advance for the blind spot area to be included. However, the estimation area may not be set. In this case, the boundary lines of the area detected by the surrounding environment recognition sensors 3 may be set as the blind spot entrance line and the blind spot exit line. For example, although not illustrated herein, the boundary line of the second area on the blind spot area side may be set as the blind spot entrance line and the boundary line of the first area on the blind spot area side may be set as the blind spot exit line.

Referring back to FIG. 1, the support execution unit 1d of the ECU 1 is a support execution unit that executes the driving support based on the trajectory of the tracking-target moving body which is tracked by the trajectory calculation unit 1c. For example, the support execution unit 1d executes the driving support for avoiding a collision between the subject vehicle and the tracking-target moving body by using various types of information (for example, acceleration, yaw rate, and vehicle speed of the subject vehicle) showing the vehicle momentum of the subject vehicle input from the vehicle momentum detection sensors 2, information on the position of the subject vehicle input from the navigation system 4, the trajectory of the tracking-target moving body tracked by the trajectory calculation unit 1c, and the like. Examples of the driving support that is executed by the support execution unit 1d include driving support by executing vehicle control, driving support by providing warning, and driving support by providing notification. The driving support by executing vehicle control is support for controlling the behavior of the vehicle via the actuator 7 so as to avoid a collision between the subject vehicle and the tracking-target moving body in cases such as immediately before the occurrence of the collision between the subject vehicle and the tracking-target moving body. The driving support by providing warning is support for providing a warning for the driver of the subject vehicle via the display 8 and/or the speaker 9 so that a driving operation for avoiding a collision is performed in a case where, for example, the collision between the subject vehicle and the tracking-target moving body is predicted to occur. The driving support by providing notification is support for providing a notification for the driver via the display 8 and/or the speaker 9 so that the driver can recognize the presence of the moving body in a case where, for example, the moving body is present at a position where a collision between the subject vehicle and the tracking-target moving body is likely to occur in the future.

According to the driving support apparatus of this embodiment as described above, the driving support can be continuously executed, even in a case where another moving body traveling in parallel to the vehicle by the vehicle moves into the blind spot area between the plurality of sensors during the execution of the driving support for the tracking-target moving body, based on the trajectory of the moving body tracked by checking the position of the moving body moving in the blind spot area.

It is desirable that the content of the support for the driving support that is executed by the support execution unit 1*d* is content of the support in accordance with the tracking accuracy for the trajectory of the tracking-target moving body that is tracked by the trajectory calculation unit 1*c*. This is because a relatively high level of accuracy is required for the execution of the driving support by executing vehicle control and it is not desirable to execute the driving support by executing vehicle control at a medium or low level of accuracy. Herein, the tracking accuracy for the trajectory of the tracking-target moving body is determined by the estimation accuracy of the position of the tracking-target moving body that is estimated by the position estimation unit 1*b* in the blind spot area. This is because a relatively unstable result may be obtained for the position of the tracking-target moving body that is estimated by the position estimation unit 1*b* in the blind spot area although a relatively stable result may be obtained for the position of the tracking-target moving body that is detected by the position detection unit 1*a* in the areas detected by the surrounding environment recognition sensors 3. According to the related art, the execution of the driving support is halted at a moment when the tracking-target moving body enters the blind spot area. In the driving support apparatus according to this embodiment, however, the driving support continues, with the position of the moving body estimated and the trajectory calculated, even if the tracking-target moving body enters the blind spot area. In addition, in the driving support apparatus according to this embodiment, the content of the supporting for the driving support is changed in accordance with the tracking accuracy for the trajectory of the tracking-target moving body because it is desirable to continue the execution of the driving support with the content in accordance with the tracking accuracy for the trajectory of the tracking-target moving body during the continuation of the execution of the driving support without halting execution of the driving support in the blind spot area.

Specifically, in this embodiment, the support execution unit 1*d* changes the content of the support for the driving support in accordance with the estimation accuracy of the position of the tracking-target moving body that is estimated by the position estimation unit 1*b*. For example, the support execution unit 1*d* executes the driving support by executing vehicle control in a case where the estimation accuracy is high, executes the driving support by providing warning in a case where the estimation accuracy is medium, and executes the driving support by providing notification in a case where the estimation accuracy is low. In a case where the estimation accuracy is high, the support execution unit 1*d* may execute the driving support by providing warning and the driving support by providing notification along with the driving support by executing vehicle control. In a case where the estimation accuracy is medium, the support execution unit 1*d* may execute the driving support by providing notification along with the driving support by providing warning. In a case where the estimation accuracy is low, it is desirable that the support execution unit 1*d* executes only the driving support by providing notification. In the driving support apparatus according to this embodiment as described above, the degree of reliability (for example, high, medium, and low) that relates to the estimation accuracy of the position of the tracking-target moving body in the blind spot area is predicted in accordance with traveling situations and the predicted estimation accuracy is transferred in advance to the support execution unit 1*d* before the execution of the driving support. Accordingly, appropriate content of the support is determined and executed by the support execution unit 1*d*.

The estimation accuracy setting unit 1*e* of the ECU 1 is an estimation accuracy setting unit that sets the estimation accuracy of the position of the tracking-target moving body which is estimated by the position estimation unit 1*b*. Hereinafter, an example of the estimation accuracy set by the estimation accuracy setting unit 1*e* will be described.

In this embodiment, the estimation accuracy setting unit 1*e* may set the estimation accuracy to decrease as the relative speed between the subject vehicle and the tracking-target moving body decreases and may set the estimation accuracy to increase as the relative speed increases. For example, in a case where the following vehicle as an approaching tracking-target moving body approaches the blind spot entrance line of the estimation area including the blind spot area for the subject vehicle to pass by the subject vehicle on a right rear side of the subject vehicle as illustrated in FIG. 4, the estimation accuracy setting unit 1*e* calculates the speed that is obtained by subtracting the speed $V1(0)$ of the subject vehicle from the speed $V2(0)$ of the moving body as the relative speed "$\Delta V(0)=V2(0)-V1(0)$". The speed of the moving body is detected based on the surrounding environment information relating to the tracking-target moving body that is input from the surrounding environment recognition sensors 3 and the speed of the subject vehicle is detected based on the signal that is input from the vehicle speed sensor 2*c*. Then, the estimation accuracy setting unit 1*e* calculates the estimation accuracy by using the arithmetic expression of "estimation accuracy=$K \times L2/\Delta V(0)$". Herein, K is a design parameter, L2 is the length (m) of the estimation area, and $\Delta V(0)$ is the relative speed. If the estimation accuracy is calculated based on this arithmetic expression, the estimation accuracy is set to decrease as $\Delta V(0)$ decreases as illustrated in FIG. 5. This is because the length of time during which the tracking-target moving body is positioned in the estimation area including the blind spot area increases as the relative speed $\Delta V(0)$ decreases and the trajectory of the moving body becomes more likely to change over time. Also, as illustrated in FIG. 5, the estimation accuracy is set to increase as the relative speed $\Delta V(0)$ increases. This is because the length of time during which the tracking-target moving body is positioned in the estimation area including the blind spot area decreases as the relative speed $\Delta V(0)$ increases and the trajectory of the moving body becomes less likely to change over time.

In addition, the estimation accuracy setting unit 1*e* may set the estimation accuracy in accordance with the attribute of the tracking-target moving body. For example, in a case where the following vehicle as an approaching tracking-target moving body is present in the second area covered by the second sensor to pass by the subject vehicle on a right rear side of the subject vehicle as illustrated in FIG. 3 above, the estimation accuracy setting unit 1e determines the attribute of the tracking-target moving body based on the information that relates to the attribute of the surrounding obstacle such as the strength, brightness, and color of the recognition target included in the surrounding environment information input from the second sensor. Examples of the attribute of the tracking-target moving body include a pedestrian, a bicycle, a motorcycle, and a car. In a case where the radar constitutes the surrounding environment recognition sensors 3, the attribute can be determined based on, for example, the strength of the waves reflected to the radar from the object. In a case where the camera constitutes the surrounding environment recognition sensors 3, the attribute can be determined based on, for example, pattern recognition. In a case where the attribute of the tracking-target moving body is the pedestrian as illustrated in FIG. 6, the estimation accuracy setting unit 1e sets the estimation accuracy to be lower than the estimation accuracy for any other attribute. In a case where the attribute of the tracking-target moving body is the car, the estimation accuracy setting unit 1e sets the estimation accuracy to be higher than the estimation accuracy for any other attribute. This is because the trajectory of the pedestrian is considered to be more likely to change than the trajectory of the car. Likewise, in a case where the attribute of the tracking-target moving body is the bicycle as illustrated in FIG. 6, the estimation accuracy setting unit 1e sets the estimation accuracy to be the second-lowest to follow the estimation accuracy for the pedestrian. In a case where the attribute of the tracking-target moving body is the motorcycle, the estimation accuracy setting unit 1e sets the estimation accuracy to be the second-highest to follow the estimation accuracy for the car. This is because the trajectory of the bicycle is considered to be more likely to change than the trajectory of the motorcycle.

The estimation accuracy setting unit 1e may set the estimation accuracy to increase as the acceleration and deceleration of the moving body other than the tracking-target moving body that is present around the subject vehicle at which the moving body approaches the tracking-target moving body decreases and may set the estimation accuracy to decrease as the acceleration and deceleration increases. For example, in a case where the moving body other than the following vehicle as the tracking-target moving body that approaches the subject vehicle on a right rear side of the subject vehicle to pass by the subject vehicle is present in front of the following vehicle and is decelerating to approach the following vehicle as illustrated in FIG. 7, the estimation accuracy setting unit 1e calculates the estimation accuracy in accordance with the deceleration of the vehicle ahead as the moving body other than the following vehicle. The deceleration is detected based on the surrounding environment information relating to the moving body other than the following vehicle input from the surrounding environment recognition sensors 3. Then, the estimation accuracy setting unit 1e calculates the estimation accuracy by using, for example, the arithmetic expression of "estimation accuracy=$K \times A_p / T_{Headway}$". Herein, K is a design parameter, $A_p$ (m/s$^2$) is the acceleration and deceleration of the moving body other than the following vehicle, and $T_{Headway}$ (s) is the inter-vehicular time from the subject vehicle to the moving body other than the following vehicle. In a case where the moving body other than the following vehicle stops, $A_p$ is equal to ∞. If the estimation accuracy is calculated based on this arithmetic expression, the estimation accuracy is set to decrease as the acceleration and deceleration increases as illustrated in FIG. 8. This is because the inter-vehicle distance becomes more likely to be adjusted and the trajectory becomes more likely to be changed through speed adjustment as the acceleration and deceleration increases so that the tracking-target moving body and the moving body other than the following vehicle do not collide with each other in the estimation area including the blind spot area. Also, the estimation accuracy is set to increase as the acceleration and deceleration decreases as illustrated in FIG. 8. This is because the likelihood of the inter-vehicle distance adjustment through speed adjustment and the likelihood of the trajectory change, the inter-vehicle distance adjustment and the trajectory change are for the tracking-target moving body and the moving body other than the following vehicle not to collide with each other in the estimation area including the blind spot area, decrease as the acceleration and deceleration decreases. In the example of FIG. 7 according to this embodiment, the deceleration of the vehicle ahead is described, as an example of the moving body other than the following vehicle as the tracking-target moving body. However, the invention is not limited thereto. Although not illustrated, in a case where, for example, a vehicle behind that is present further behind the following vehicle as the moving body is the moving body other than the following vehicle that is a tracking target, the estimation accuracy setting unit 1e may set the estimation accuracy as described above in accordance with the acceleration of the vehicle behind.

The estimation accuracy setting unit 1e may set the estimation accuracy to increase as the distance from the subject vehicle to the intersection increases and may set the estimation accuracy to decrease as the distance decreases. The distance to the intersection is detected based on the information on the position of the subject vehicle input from the GPS sensor 4a of the navigation system 4 and the information on the position of the intersection input from the map database 4b. For example, assuming a case where the subject vehicle moves into the vicinity of the intersection as illustrated in FIG. 9, the parallel-traveling vehicle as the tracking-target moving body moving in the blind spot area for the subject vehicle is likely to turn right along the road structure at the intersection and the pedestrian as the tracking-target moving body moving in the blind spot area for the subject vehicle is likely to turn to the right along the sidewalk at the intersection. As described above, the tracking-target moving body is likely to change the trajectory by, for example, turning right or left while moving, without moving and traveling in parallel to the subject vehicle, at the intersection even in a case where the subject vehicle travels straight. As illustrated in FIG. 9, a predetermined distance L4 is set as a threshold for determining whether the distance to the intersection is long or short and the estimation accuracy setting unit 1e determines that the distance to the intersection is short in a case where the distance from the subject vehicle to the intersection is shorter than the predetermined distance L4 and determines that the distance to the intersection is long in a case where the distance from the subject vehicle to the intersection is longer than the predetermined distance L4. If the distance to the intersection is determined in this manner, the estimation accuracy is set to decrease as the distance to the intersection decreases as illustrated in FIG. 10. This is because the tracking-target moving body becomes more likely to change the trajectory by moving along the road structure at the intersection in the estimation area including the blind spot area as the distance to the intersection decreases. Also, the estimation accuracy is set to increase as the distance to the intersection increases as illustrated in FIG. 10. This is because the likelihood of the trajectory change by the tracking-target moving body based on the movement along the road structure at the intersection in the estimation area including the blind spot area decreases as the distance to the intersection increases.

The estimation accuracy setting unit 1e may set the estimation accuracy to increase as the humidity around the subject vehicle decreases and may set the estimation accuracy to decrease as the humidity increases. The humidity around the subject vehicle is detected based on the signal input from the humidity sensor 5. For example, as illustrated in FIG. 11, the estimation accuracy is set to decrease as the humidity around the subject vehicle increases. This is because the weather more affects the tracking-target moving body, the moving body becomes more likely to be speed-adjusted, and the trajectory becomes more likely to be changed as the humidity increases. Also, the estimation accuracy is set to increase as the humidity around the subject vehicle decreases as illustrated in FIG. 11. This is because the weather less affects the tracking-target moving body, the moving body becomes less likely to be speed-adjusted, and the trajectory becomes less likely to be changed as the humidity decreases.

The estimation accuracy setting unit 1e may set the estimation accuracy to increase as the rainfall around the subject vehicle decreases and may set the estimation accuracy to decrease as the rainfall increases. The rainfall around the subject vehicle is detected, based on the signal that shows the wiper operation speed which is input from the wiper sensor 6, to be large at a high operation speed and to be small at a low operation speed. For example, the estimation accuracy is set to decrease as the wiper operation speed around the subject vehicle increases as illustrated in FIG. 12. This is because a large-rainfall situation is assumed at a high wiper operation speed and the weather more affects the tracking-target moving body, the moving body becomes more likely to be speed-adjusted, and the trajectory becomes more likely to be changed in this large-rainfall situation. Also, the estimation accuracy is set to increase as the wiper operation speed decreases as illustrated in FIG. 12. This is because a small-rainfall situation is assumed at a low wiper speed and the weather less affects the tracking-target moving body, the moving body becomes less likely to be speed-adjusted, and the trajectory becomes less likely to be changed in this small-rainfall situation.

According to the driving support apparatus of this embodiment, the tracking accuracy for the trajectory of the tracking-target moving body can be appropriately set in various situations as described above. Accordingly, the execution of the driving support can continue without stopping in the blind spot area, and the driving support can continue with appropriate content of the support in accordance with the tracking accuracy for the trajectory of the tracking-target moving body.

Figure 13:
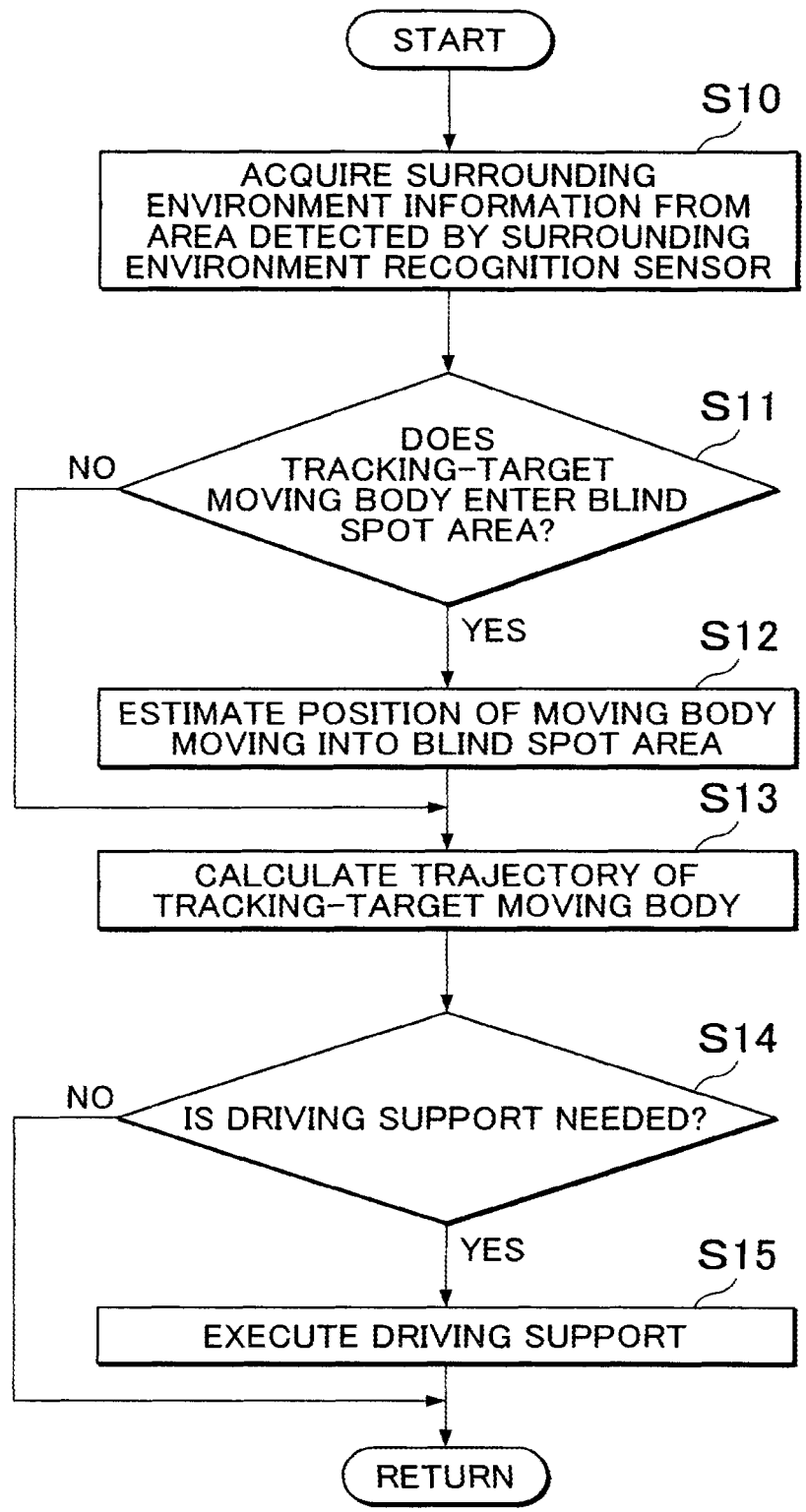
FIG. 13 is a flowchart illustrating an example of the basic processing that is executed by the driving support apparatus according to the invention.
Figure 14:
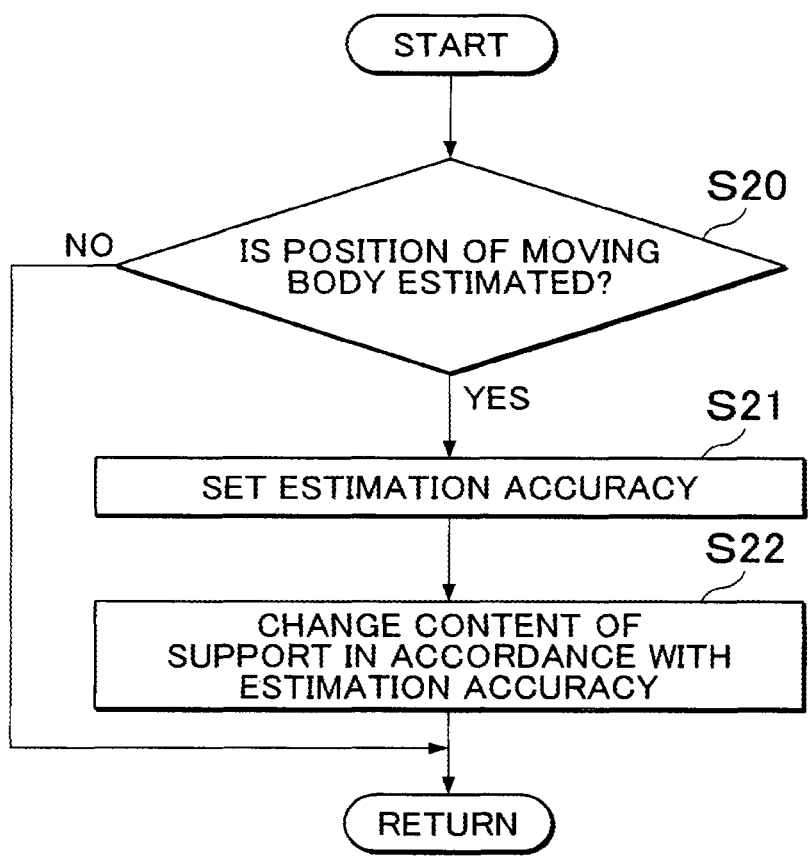
FIG. 14 is a flowchart illustrating examples of estimation accuracy setting processing and driving support change processing that are executed by the driving support apparatus according to the invention.

Next, various types of processing that are executed by the driving support apparatus described above will be described with reference to FIGS. 13 and 14. FIG. 13 is a flowchart illustrating an example of the basic processing that is executed by the driving support apparatus according to the invention. FIG. 14 is a flowchart illustrating examples of estimation accuracy setting processing and driving support change processing that are executed by the driving support apparatus according to the invention. In this embodiment, the various types processing that are illustrated in FIGS. 13 and 14 are repeatedly executed in short computation periods.

As illustrated in FIG. 13, the ECU 1 acquires the surrounding environment information from the areas detected by the surrounding environment recognition sensors 3 (Step S10). In Step S10, the ECU 1 acquires, for example, the surrounding environment information relating to the following vehicle as the tracking-target moving body moving in the second area covered by the sensor 2 as the second sensor as illustrated in FIG. 3 above.

The ECU 1 determines whether or not the tracking-target moving body enters the blind spot area (Step S11) based on the surrounding environment information that is acquired in Step S10. In Step S11, the ECU 1 determines that the tracking-target moving body enters the blind spot area for the subject vehicle in a case where, for example, the time t(s) required for the moving body to move to the blind spot entrance line satisfies the condition of "t(s)<ΔT(s)" as illustrated in FIG. 3 above. In a case where the time t(s) required for the moving body to move to the blind spot entrance line does not satisfy the condition of "t(s)<ΔT(s)", the ECU 1 determines that the tracking-target moving body does not enter the blind spot area for the subject vehicle.

In a case where it is determined in Step S11 that the tracking-target moving body enters the blind spot area (Step S11: Yes), the ECU 1 allows the processing to proceed to Step S12. In a case where it is determined in Step S11 that the tracking-target moving body does not enter the blind spot area (Step S11: No), the ECU 1 allows the processing to proceed to Step S13.

The ECU 1 estimates the position of the moving body moving in the blind spot area (Step S12) based on the surrounding environment information that is acquired in Step S10. If, for example, the position $(x_0, y_0)$ and the speed $(Vx_0, Vy_0)$ of the moving body are detected in Step S12 on the blind spot entrance line corresponding to the lower side of the estimation area in the second area covered by the second sensor as illustrated in FIG. 3 above, the ECU 1 estimates the position $(x', y')$ and the speed $(V'x, V'y)$ of the moving body moving in the estimation area including the blind spot area. For example, the ECU 1 calculates the x coordinate showing the position of the moving body moving in the estimation area as "$x'=x_0+(Vx_0)\times$estimated elapsed time" and calculates the y coordinate showing the position of the moving body moving in the estimation area as "$y'=y_0+(Vy_0)\times$estimated elapsed time". In addition, the ECU 1 calculates the speed of the moving body moving in the estimation area as "$(V'x, V'y)=(Vx_0, Vy_0)$" on the assumption that the moving body moves in the estimation area in a state where the speed $(Vx_0, Vy_0)$ detected on the blind spot entrance line is maintained.

With the position estimation processing performed in Step S12 in the case of a Yes determination in Step S11, the ECU 1 calculates the trajectory of the moving body (Step S13) based on the position of the tracking-target moving body that is detected from the surrounding environment information acquired in Step S10 (for example, the position of the moving body moving in the second area covered by the second sensor) and the position of the tracking-target moving body that is estimated in Step S12 (for example, the position of the moving body moving in the estimation area including the blind spot area). With the position estimation processing not performed in Step S12 in the case of a No determination in Step S11, the ECU 1 calculates the trajectory of the moving body in Step S13 based on the position of the tracking-target moving body that is detected from the surrounding environment information acquired in Step S10 (for example, the position of the moving body moving in the second area covered by the second sensor).

The ECU 1 determines whether or not the driving support needs to be executed for the subject vehicle (Step S14) based on the trajectory of the moving body that is tracked in Step S13. In Step S14, the ECU 1 computes the likelihood of a collision between the subject vehicle and the moving body by, for example, using the trajectory of the moving body that is tracked in Step S13 and determines that the driving support needs to be executed in a case where the collision is found to be likely as a result of the computation. In Step S14, the ECU 1 determines that the driving support does not have to be executed in a case where the collision is found to be unlikely as a result of the computation, and returns this processing. Then, the processing in FIG. 13 is repeatedly executed.

In a case where it is determined in Step S14 that the driving support needs to be executed for the subject vehicle (Step S14: Yes), the ECU 1 executes the driving support in accordance with the likelihood of the collision (Step S15). In Step S15, the ECU 1 executes, for example, the support for controlling the behavior of the vehicle, as the driving support by executing vehicle control, via the actuator 7 so as to avoid the collision between the subject vehicle and the tracking-target moving body. In addition, in Step S15, the ECU 1 may execute the driving support by providing warning and the driving support by providing notification in addition to the driving support by executing vehicle control. After the processing of Step S15, this processing is terminated. Then, the processing in FIG. 13 is repeatedly executed.

In a case where the processing in FIG. 13 is repeatedly executed, the ECU 1 executes, for example, the following processing in Step S13 described above. As an example, a case where the position estimation processing is performed in Step S12 in the case of a Yes determination in Step S11 of the previous processing and then the processing in FIG. 13 is executed again and a No determination is made in Step S11 of the current processing will be described. In this case, the ECU 1 calculates the trajectory of the tracking-target moving body based on the position of the tracking-target moving body that is detected from the surrounding environment information acquired in Step S10 of the previous processing (for example, the position of the moving body moving in the second area covered by the second sensor), the position of the tracking-target moving body that is estimated in Step S12 of the previous processing (for example, the position of the moving body moving in the estimation area including the blind spot area), and the position of the tracking-target moving body that is detected from the surrounding environment information acquired in Step S10 of the current processing (for example, the position of the moving body moving in the first area covered by the first sensor).

In addition, in the driving support apparatus according to this embodiment, the estimation accuracy setting processing and the driving support change processing that are illustrated in FIG. 14 to be described below are executed in conjunction with the basic processing that is illustrated in FIG. 13 described above.

As illustrated in FIG. 14, the ECU 1 determines (Step S20) whether the position of the moving body moving in the blind spot area has been estimated, that is, whether or not the position estimation processing corresponding to the processing of Step S12 in FIG. 13 described above has been performed. In a case where it is determined in Step S20 that the estimation of the position of the moving body has not been performed (Step S20: No), the ECU 1 returns this processing. Then, the processing in FIG. 14 is repeatedly executed.

In a case where it is determined in Step S20 that the estimation of the position of the moving body has been performed (Step S20: Yes), the ECU 1 sets the estimation accuracy (Step S21) by using at least one of the methods illustrated in FIGS. 4 to 12 described above based on the surrounding environment information acquired in Step S10 in FIG. 13. In Step S21, the estimation accuracy is set to decrease as the relative speed between the subject vehicle and the tracking-target moving body decreases and to increase as the relative speed increases. Herein, the estimation accuracy may be set in accordance with the attribute of the tracking-target moving body. In addition, the estimation accuracy may be set to increase as the acceleration and deceleration at which the moving body other than the tracking-target moving body present around the subject vehicle approaches the tracking-target moving body decreases and to decrease as the acceleration and deceleration increases. In addition, the estimation accuracy may be set to increase as the distance from the subject vehicle to the intersection increases and to decrease as the distance decreases. In addition, the estimation accuracy may be set to increase as the humidity around the subject vehicle decreases and to decrease as the humidity increases. In addition, the estimation accuracy may be set to increase as the rainfall around the subject vehicle decreases and to decrease as the rainfall increases.

The ECU 1 changes the content of the support for the driving support (Step S22) in accordance with the estimation accuracy that is set in Step S21. For example, in Step S22, the ECU 1 changes the content of the support to execute the driving support by executing vehicle control in a case where the estimation accuracy is high, execute the driving support by providing warning in a case where the estimation accuracy is medium, and execute the driving support by providing notification in a case where the estimation accuracy is low. The content of the support for the driving support changed in Step S22 is executed in the processing of Step S15 illustrated in FIG. 13 described above. After the processing of Step S22, this processing is returned. Then, the processing in FIG. 14 is repeatedly executed.

The invention claimed is:

1. A driving support apparatus provided on a subject vehicle, the driving support apparatus comprising:
a position detection unit configured to detect a position of a tracking-target moving body moving in a first area and a second area, the first area being located on a front side of the subject vehicle, the second area being located on a rear side of the subject vehicle;
a position estimation unit configured to estimate a position of the tracking-target moving body moving in a blind spot area based on the position of the tracking-target moving body detected in any one of the first area and the second area by the position detection unit, the blind spot area being an area other than the first area and the second area;
a trajectory calculation unit configured to
calculate a trajectory of the tracking-target moving body, so that a trajectory of the tracking-target moving body detected in at least one of the first area and the second area and a trajectory of the tracking-target moving body estimated in the blind spot area are continuous to each other, by estimating the position of the tracking-target moving body by controlling the position estimation unit when the tracking-target moving body leaves one of the first area and the second area and enters the blind spot area and by detecting the position of the tracking-target moving body by controlling the position detection unit when the tracking-target moving body leaves the blind spot area and enters the other one of the first area and the second area, and determine that the tracking-target moving body leaves the second area and enters the blind spot area using a blind spot entrance confirmation area, the blind spot entrance confirmation area being set in advance, being set to have a predetermined range, and being situated on the rear side of the subject vehicle with respect to the blind spot area; and a support execution unit configured to execute driving support based on the trajectory of the tracking-target moving body calculated by the trajectory calculation unit.

2. The driving support apparatus according to claim 1, wherein the support execution unit is configured to change a content of the support for the driving support in accordance with an estimation accuracy of the position of the tracking-target moving body estimated by the position estimation unit.

3. The driving support apparatus according to claim 2, wherein the support execution unit is configured to execute the driving support by executing vehicle control in a case where the estimation accuracy is higher than a case where the driving support is executed by providing notification.

4. The driving support apparatus according to claim 2, wherein the estimation accuracy is set to decrease as a relative speed between the subject vehicle and the tracking-target moving body decreases and to increase as the relative speed increases.

5. The driving support apparatus according to claim 2, wherein the estimation accuracy is set in accordance with an attribute of the tracking-target moving body.

6. The driving support apparatus according to claim 2, wherein the estimation accuracy is set to increase as an acceleration and deceleration of a moving body other than the tracking-target moving body present around the subject vehicle at which the moving body approaches the tracking-target moving body decreases and to decrease as the acceleration and deceleration increases.

7. The driving support apparatus according to claim 2, wherein the estimation accuracy is set to increase as a distance from the subject vehicle to an intersection increases and to decrease as the distance decreases.

8. The driving support apparatus according to claim 2, wherein the estimation accuracy is set to increase as a humidity around the subject vehicle decreases and to decrease as the humidity increases.

9. The driving support apparatus according to claim 2, wherein the estimation accuracy is set to increase as a rainfall around the subject vehicle decreases and to decrease as the rainfall increases.

10. A driving support apparatus providing on a subject vehicle, the driving support apparatus comprising:

processing circuitry configured to:

detect a position of a tracking-target moving body moving in a first area and a second area, the first area being located on a front side of the subject vehicle, the second area being located on a rear side of the subject vehicle;

estimate a position of the tracking-target moving body moving in a blind spot area based on the position of the tracking-target moving body detected in any one of the first area and the second area, the blind spot area being an area other than the first area and the second area;

calculate a trajectory of the tracking-target moving body, so that a trajectory of the tracking-target moving body detected in at least one of the first area and the second area and a trajectory of the tracking-target moving body estimated in the blind spot area are continuous to each other, by estimating the position of the tracking-target moving body when the tracking-target moving body leaves one of the first area and the second area and enters the blind spot area and by detecting the position of the tracking-target moving body when the tracking-target moving body leaves the blind spot area and enters the other one of the first area and the second area;

determine that the tracking-target moving body leaves the second area and enters the blind spot area using a blind spot entrance confirmation area, the blind spot entrance confirmation area being set in advance, being set to have a predetermined range, and being situated on the rear side of the subject vehicle with respect to the blind spot area; and execute driving support based on the calculated trajectory of the tracking-target moving body.

11. The driving support apparatus according to claim 10, wherein the processing circuitry is further configured to change a content of the support for the driving support in accordance with an estimation accuracy of the estimated position of the tracking-target moving body.

12. The driving support apparatus according to claim 11, wherein the processing circuitry is further configured to execute the driving support by executing vehicle control in a case where the estimation accuracy is higher than a case where the driving support is executed by providing notification.

13. The driving support apparatus according to claim 11, wherein the estimation accuracy is set to decrease as a relative speed between the subject vehicle and the tracking-target moving body decreases and to increase as the relative speed increases.

14. The driving support apparatus according to claim 11, wherein the estimation accuracy is set in accordance with an attribute of the tracking-target moving body.

15. The driving support apparatus according to claim 11, wherein the estimation accuracy is set to increase as an acceleration and deceleration of a moving body other than the tracking-target moving body present around the subject vehicle at which the moving body approaches the tracking-target moving body decreases and to decrease as the acceleration and deceleration increases.

16. The driving support apparatus according to claim 11, wherein the estimation accuracy is set to increase as a distance from the subject vehicle to an intersection increases and to decrease as the distance decreases.

17. The driving support apparatus according to claim 11, wherein the estimation accuracy is set to increase as a humidity around the subject vehicle decreases and to decrease as the humidity increases.

18. The driving support apparatus according to claim 11, wherein the estimation accuracy is set to increase as a rainfall around the subject vehicle decreases and to decrease as the rainfall increases.

* * * * *